US009955120B2

(12) United States Patent
Chaney et al.

(10) Patent No.: US 9,955,120 B2
(45) Date of Patent: Apr. 24, 2018

(54) MULTIUSER TELEPRESENCE INTERACTION

(71) Applicant: SONY INTERACTIVE ENTERTAINMENT LLC, San Mateo, CA (US)

(72) Inventors: Allison Marlene Chaney, San Francisco, CA (US); Megan Moyer, Oakland, CA (US); Chris David Oliver, Glendora, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/290,989

(22) Filed: Oct. 11, 2016

(65) Prior Publication Data
US 2017/0237940 A1 Aug. 17, 2017

Related U.S. Application Data

(60) Provisional application No. 62/294,681, filed on Feb. 12, 2016.

(51) Int. Cl.
*H04M 7/14* (2006.01)
*H04N 7/15* (2006.01)
*H04N 7/14* (2006.01)
*H04N 13/04* (2006.01)

(52) U.S. Cl.
CPC ............ *H04N 7/157* (2013.01); *H04N 7/142* (2013.01); *H04N 13/0459* (2013.01); *H04N 13/0484* (2013.01)

(58) Field of Classification Search
CPC .......... H04N 7/141; H04N 7/144; H04N 7/15; H04N 13/0242; H04N 13/0253; H04N 13/0278; H04N 2013/0081; H04N 2213/003; G06T 15/10; G06T 19/006
USPC ........... 348/14.01, 14.05, 14.07, 14.09, 14.1, 348/14.12, 14.16
See application file for complete search history.

(56) References Cited

U.S. PATENT DOCUMENTS

| 5,580,249 A * | 12/1996 | Jacobsen | A63B 22/0056 434/11 |
| 2007/0237029 A1* | 10/2007 | Watson | G01S 5/22 367/120 |
| 2010/0079576 A1* | 4/2010 | Yuen | H04N 7/144 348/14.16 |
| 2010/0238263 A1* | 9/2010 | Robinson | H04N 7/144 348/14.08 |
| 2013/0300637 A1* | 11/2013 | Smits | G03B 35/18 345/8 |

(Continued)

*Primary Examiner* — Binh Kien Tieu
(74) *Attorney, Agent, or Firm* — Trellis IP Law Group, PC

(57) ABSTRACT

Implementations generally relate to virtual reality telepresence. In some implementations, a method includes positioning a first user in a virtual environment, and determining a first point of view associated with the first user. The method further includes positioning a second user in the virtual environment, and determining a second point of view associated with the second user. The method further includes projecting one or more of the first user and the second user in the virtual environment based on a first positioning of the first user and a second positioning of the second user and based on the first point of view and the second point of view.

20 Claims, 24 Drawing Sheets

(56) References Cited

U.S. PATENT DOCUMENTS

| | | | |
|---|---|---|---|
| 2013/0321564 A1* | 12/2013 | Smith | G06T 15/04 |
| | | | 348/14.08 |
| 2014/0075370 A1* | 3/2014 | Guerin | G06F 3/04815 |
| | | | 715/779 |
| 2015/0163454 A1* | 6/2015 | Smith | H04N 7/157 |
| | | | 348/14.07 |
| 2015/0244976 A1* | 8/2015 | Chen | H04N 7/141 |
| | | | 348/14.07 |
| 2016/0028991 A1* | 1/2016 | Smith | G06T 15/04 |
| | | | 348/14.16 |
| 2016/0227172 A1* | 8/2016 | Safaei | G06T 15/20 |

* cited by examiner

MULTIUSER TELEPRESENCE INTERACTION

CROSS REFERENCE TO RELATED APPLICATIONS

This application is related to the following application, U.S. patent application Ser. No. 62/294,681, entitled EYE2EYE: A CONNECTED DANCE EXPERIENCE, filed on Feb. 12, 2016, which is hereby incorporated by reference as if set forth in full in this application for all purposes.

BACKGROUND

Telepresence involves the use of virtual reality technology, where users across geographically dispersed locations remotely interact with each other such that the users experience the sensation of being present in the same environment. Telepresence may be used in various applications such as video conferencing, where participants communicate with each other in real-time across geographically dispersed locations.

SUMMARY

In some implementations, a method includes positioning a first user in a virtual environment, and determining a first point of view associated with the first user. The method further includes positioning a second user in the virtual environment, and determining a second point of view associated with the second user. The method further includes projecting one or more of the first user and the second user in the virtual environment based on a first positioning of the first user and a second positioning of the second user and based on the first point of view and the second point of view.

With further regard to the method, in some implementations, the first positioning of the first user and the second positioning of the second user are based on one or more of respective red-green-blue video data and depth data. In some implementations, the first positioning of the first user and the second positioning of the second user are based on respective poses of the first user and the second user. In some implementations, the first positioning of the first user and the second positioning of the second user are based on respective skeletal tracking information associated with the first user and the second user. In some implementations, the method further includes determining the first point of view based on head tracking of the first user, and determining the second point of view based on head tracking of the second user. In some implementations, the method further includes projecting information in the virtual environment based on movement of one or more of the first user and the second user. In some implementations, the method further includes simulating eye contact between the first user and the second user in the virtual environment.

In some implementations, software is encoded in one or more non-transitory computer-readable storage media for execution by the one or more processors. When executed, the software is operable to perform operations including positioning a first user in a virtual environment, and determining a first point of view associated with the first user. The software when executed is further operable to perform operations including positioning a second user in the virtual environment, and determining a second point of view associated with the second user. The software when executed is further operable to perform operations including projecting one or more of the first user and the second user in the virtual environment based on a first positioning of the first user and a second positioning of the second user and based on the first point of view and the second point of view.

With further regard to the software, in some implementations, the first positioning of the first user and the second positioning of the second user are based on one or more of respective red-green-blue video data and depth data. In some implementations, the first positioning of the first user and the second positioning of the second user are based on respective poses of the first user and the second user. In some implementations, the first positioning of the first user and the second positioning of the second user are based on respective skeletal tracking information associated with the first user and the second user. In some implementations, the software when executed is further operable to perform operations including determining the first point of view based on head tracking of the first user, and determining the second point of view based on head tracking of the second user. In some implementations, the software when executed is further operable to perform operations including projecting information in the virtual environment based on movement of one or more of the first user and the second user. In some implementations, the software when executed is further operable to perform operations including simulating eye contact between the first user and the second user in the virtual environment.

In some implementations, a system includes one or more processors, and includes logic encoded in one or more non-transitory computer-readable storage media for execution by the one or more processors. When executed, the logic is operable to perform operations including positioning a first user in a virtual environment, and determining a first point of view associated with the first user. The logic when executed is further operable to perform operations including positioning a second user in the virtual environment, and determining a second point of view associated with the second user. The logic when executed is further operable to perform operations including projecting one or more of the first user and the second user in the virtual environment based on a first positioning of the first user and a second positioning of the second user and based on the first point of view and the second point of view.

With further regard to the system, in some implementations, the first positioning of the first user and the second positioning of the second user are based on one or more of respective red-green-blue video data and depth data. In some implementations, the first positioning of the first user and the second positioning of the second user are based on respective poses of the first user and the second user. In some implementations, the first positioning of the first user and the second positioning of the second user are based on respective skeletal tracking information associated with the first user and the second user. In some implementations, the logic when executed is further operable to perform operations including determining the first point of view based on head tracking of the first user, and determining the second point of view based on head tracking of the second user. In some implementations, the logic when executed is further operable to perform operations including projecting information in the virtual environment based on movement of one or more of the first user and the second user.

A further understanding of the nature and the advantages of particular implementations disclosed herein may be realized by reference of the remaining portions of the specification and the attached drawings.

DETAILED DESCRIPTION

Implementations described herein provide an immersive multi-user virtual reality (VR) telepresence system. The system provides an interactive virtual environment to one or more users and enhances natural user interaction for users when interacting with the projected virtual environment.

Various implementations provide spontaneous social interactions, where multiple users may view each other and interact with each other in the virtual environment. Such social interactions may vary. For example, implementations may include visual expression (e.g., dance and other performing arts) and communication (e.g., collaboration, etc.) between remote users co-located in a virtual environment.

As described in more detail below, the system automatically calibrates the sizes of the users and other objects in the virtual environment such that that projected users and other objects appear to be the correct size and proportional in the scenes of the virtual environment. In various implementations, when the system displays users in the virtual environment, the system tracks movements of users, including their head movements, and the system simulates eye contact between users as they interact with each other in the virtual environment.

The telepresence system may be used in various virtual reality and augmented reality applications. For example, such applications may include teleconferencing, training, instruction, leisure and gaming, remote medicine, industrial applications, etc.

Figure 1:
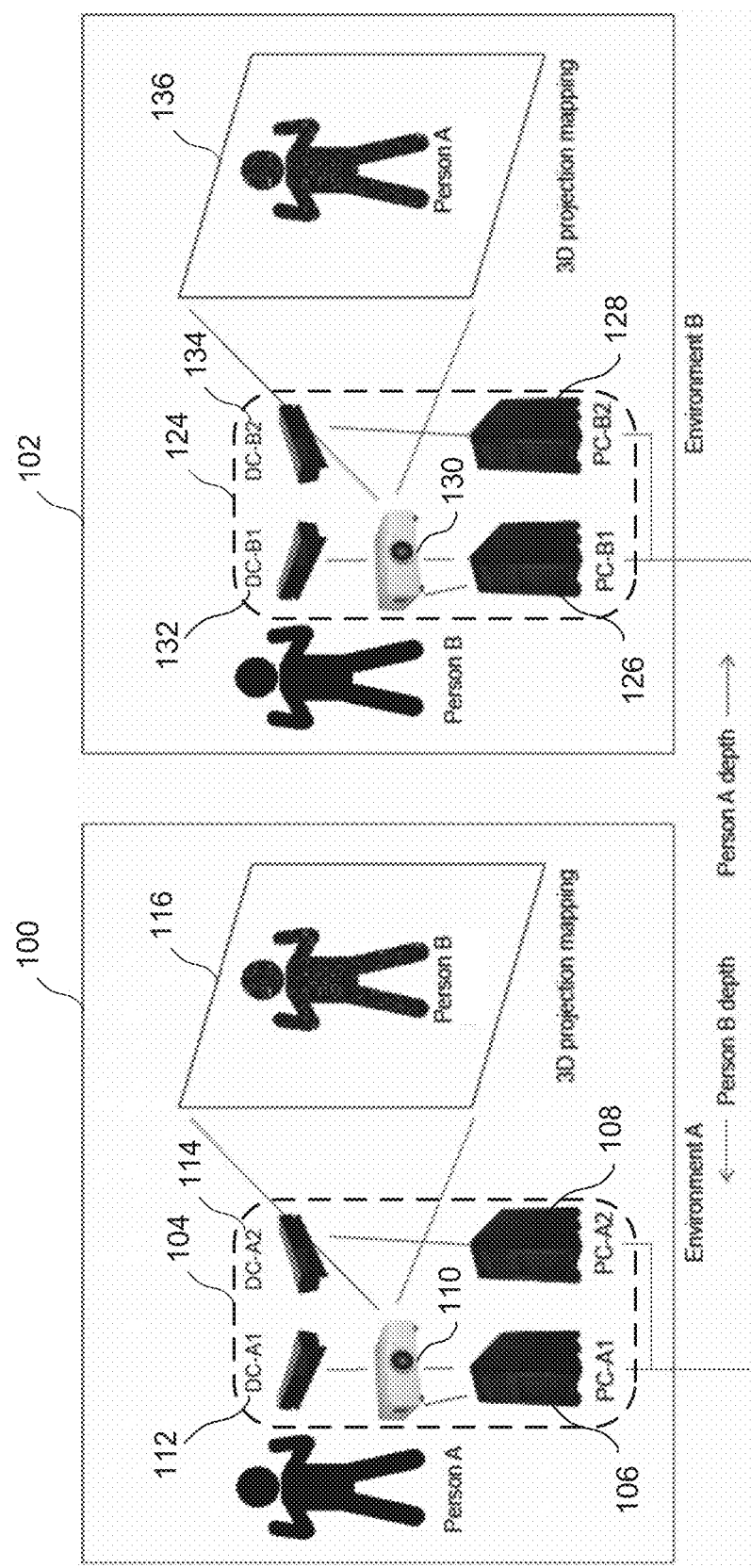
FIG. 1 illustrates a block diagram of example telepresence environments, which may be used for some implementations described herein.

FIG. 1 illustrates a block diagram of example telepresence environments 100 and 102, which may be used for some implementations described herein. As shown, telepresence environment 100, or environment 100, includes a telepresence system 104, or system 104. System 104 includes one or more computing systems 106 and 108 (also labeled PC-A1 and PC-A2, respectively), a 3-dimensional (3D) projector 110, one or more depth cameras 112 and 114 (also labeled DC-A1 and DC-A2, respectively). Also shown is a projection area 116. In some implementations, computing systems 106 and 108 may be integrated into a single device. Similarly, depth camera 112 and depth camera 114 may be integrated into a single device, and may be referred to as depth camera 112/114.

For ease of illustration, FIG. 1 shows two blocks for computing systems 106 and 108, one block for 3D projector 110, and two blocks for depth cameras 112 and 114. Each of blocks 106, 108, 110, 112, and 114 may represent multiple units, and there may be any number of these units or elements. In other implementations, system 104 may not have all of the elements shown and/or may have other elements including other types of elements instead of, or in addition to, those shown herein.

In various implementations, 3D projector 110 performs projection mapping of projection area 116 onto which 3D projector 110 projects a virtual environment. 3D projector 110 also projects one or more remote users (e.g., Person B, etc.) in the projected virtual environment. A local user (e.g., Person A) local to environment 100 can view and interact with the virtual environment by 3D projector 130. Depth camera 112 scans the local user (e.g., Person A) for user information, and depth camera 114 scans the projection area in environment 102 for environment geometry data, which is used for the projection mapping. In various implementations, depth cameras 112 and 114 each provide bit map images that describe depth data of an environment. System 104 and its various components are described in more detail herein.

Telepresence environment 102, or environment 102, includes a telepresence system 124, or system 124. System 124 includes one or more computing systems 126 and 128 (also labeled PC-B1 and PC-B2, respectively), a 3D projector 130, one or more depth cameras 132 and 134 (also labeled DC-B1 and DC-B2, respectively). Also shown is a projection area 136. In some implementations, computing systems 126 and 128 may be integrated into a single device. Similarly, depth camera 132 and depth camera 134 may be integrated into a single device.

For ease of illustration, FIG. 1 shows two blocks for computing systems 126 and 128, one block for 3D projector 130, and two blocks for depth cameras 132 and 134. Each of blocks 126, 128, 130, 132, and 134 may represent multiple units, and there may be any number of these units or elements. In other implementations, system 124 may not have all of the elements shown and/or may have other elements including other types of elements instead of, or in addition to, those shown herein. Furthermore, in various implementations, there may be more than 2 users viewing each other along with corresponding telepresence systems, etc.

In various implementations, 3D projector 130 performs projection mapping of projection area 136 onto which 3D projector 130 projects a virtual environment. 3D projector 130 also projects one or more remote users (e.g., Person A, etc.) in the projected virtual environment. A local user (e.g., Person B) local to environment 102 can view and interact with the virtual environment projected by 3D projector 130. Depth camera 132 scans the local user (e.g., Person B) for user information, and depth camera 134 scans the projection area in environment 102 for environment geometry data, which is used for the projection mapping. System 124 and its various components are described in more detail herein.

As a result, in various implementations, the 3D images of the multiple users are transmitting over the network such that multiple users (e.g., Person A, Person B, etc.) may view each other and interact with each other in the virtual environment. As described in more detail below, in various implementations, systems 104 and 124 project video of users such that they appear to be life size in the virtual environment. As described in more detail herein, in various implementations, when systems 104 and 124 display users in the virtual environment, the systems track movements of users, including their head movements, and simulate eye contact between users as they interact with each other in the virtual environment.

Figure 2:
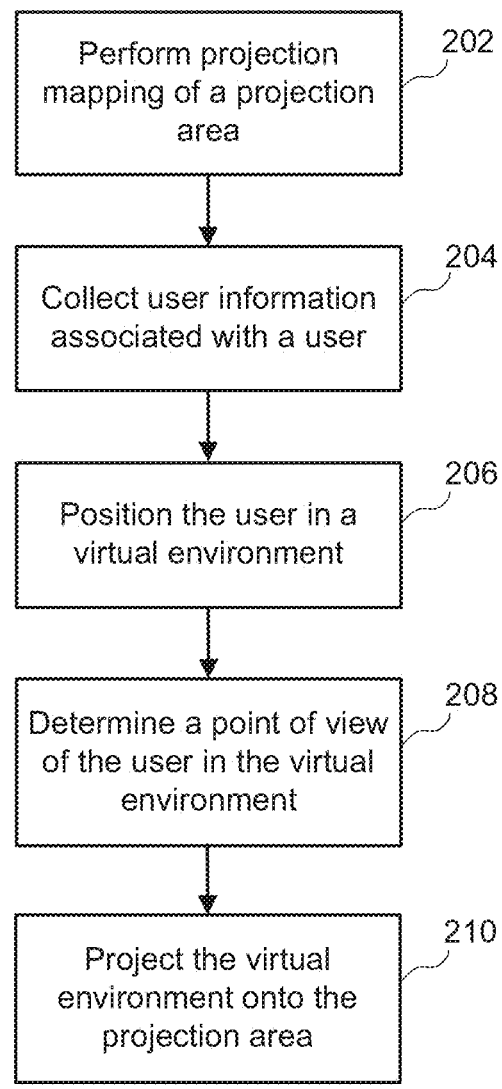
FIG. 2 illustrates an example flow diagram for implementing a telepresence system, according to some implementations.

FIG. 2 illustrates an example flow diagram for implementing a telepresence system, according to some implementations. As described in more detail herein, environment 100 projects a virtual environment to one or more users and enhances natural user interaction of the users with the projected virtual environment.

For simplicity and ease of illustration, unless otherwise indicated, the following implementations are described in the context of system 104 and environment 100 of FIG. 1, where Person A is the local user and Person B is the remote user. These implementations also apply to system 124 and environment 102 of FIG. 1.

Referring to both FIGS. 1 and 2, a method is initiated at block 202, system 104 performs projection mapping of a projection area. As described in more detail herein, the projection mapping is based on collected depth data or environment geometry data associated with the projection area. In some implementations, during the projection mapping, system 104 may also perform distortion correction in the projected virtual environment.

During the projection mapping, in some implementations, 3D projector 110 of system 104 displays structured light patterns on the projection area.

Figure 3:
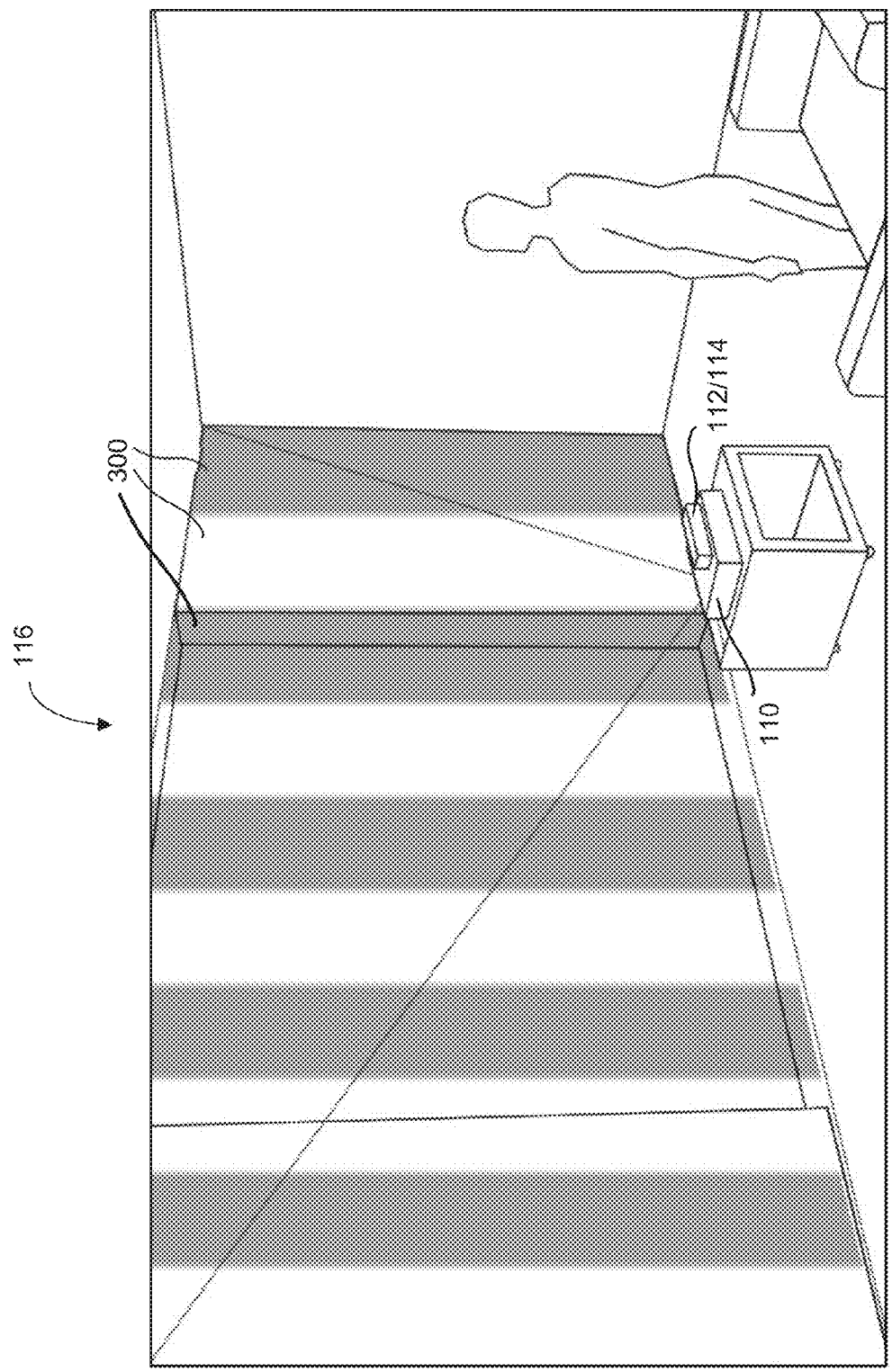
FIG. 3 illustrates an example projection of structured light patterns on a projection area, according to some implementations.

FIG. 3 illustrates an example projection of structured light patterns 300 on projection area 116, according to some implementations. In various implementations, depth sensor 112/114 measures the degree of displacement and varying widths of visual light patterns. Depth sensor 112/114 also measures real-world dimensional measurements of the scene collected using infrared light. This results in scale 3D coordinates of the area geometry and projected display.

In some implementations, projection area 116 may be a flat surface such as a wall. In various implementations, projection area 116 may include one or more walls in varying degrees of vision (e.g., 130°, 180°, etc.).

During the projection mapping, in some implementations, depth camera 112/114 of system 104 scans projection area 116 in order to collect depth data, or environment geometry data, associated with the projection area for projection mapping. For ease of illustration, depth camera 112 and depth camera 114 are shown as a single device, and referred to as depth camera 112/114.

Figure 4:
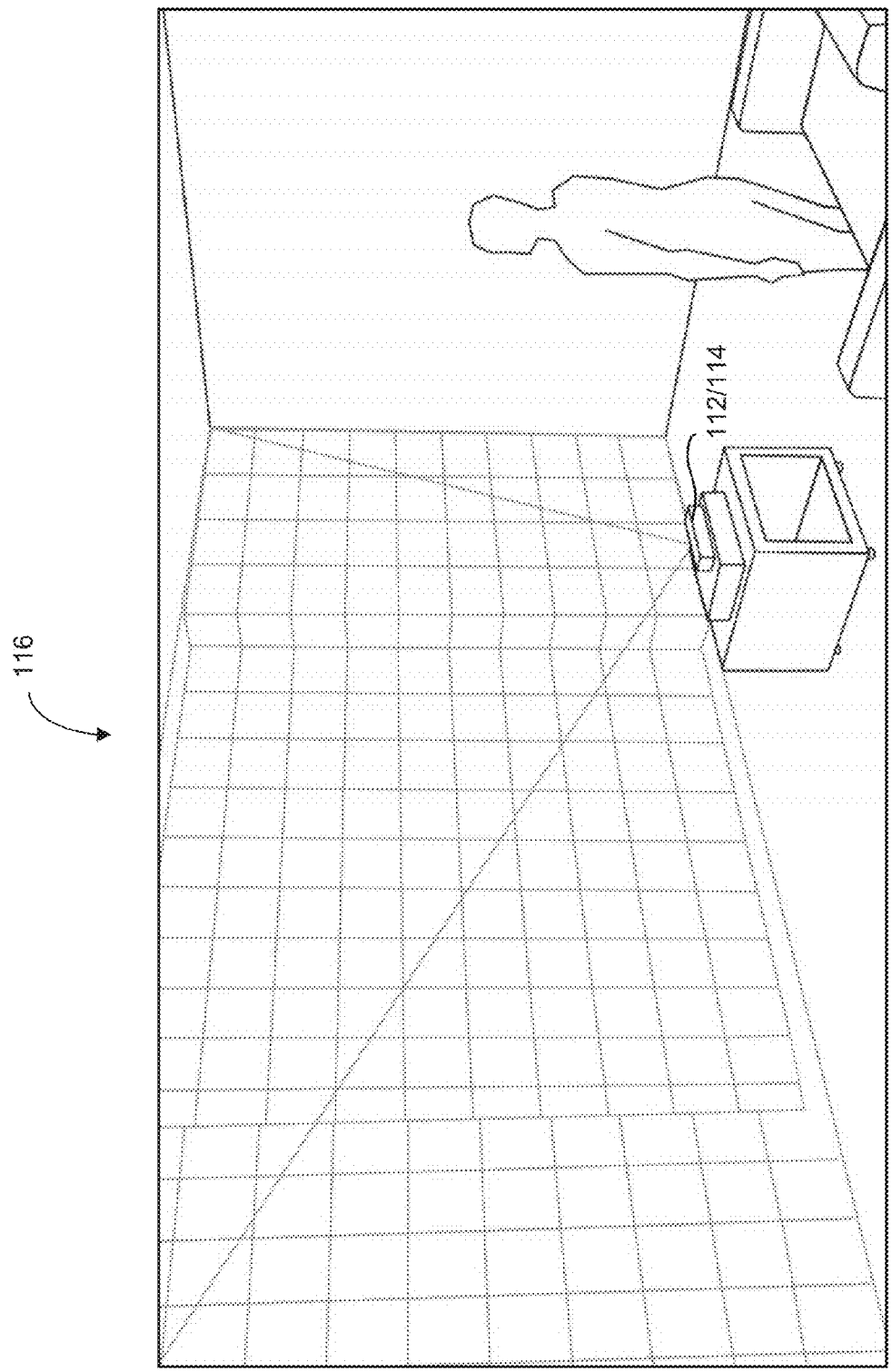
FIG. 4 illustrates an example scanning of the projection area, according to some implementations.

FIG. 4 illustrates an example scanning of projection area 116, according to some implementations. Depth data or environment geometry data may include, for example, topography, size measurements, height measurements, width measurements, depth measurements, etc.

Depth camera 112/114 senses projection fields and enables parallax distortion of the projected virtual environment by 3D projector 110.

Referring still to FIG. 2, at block 204, system 104 collects user information associated with the user (e.g., local user). As described in more detail herein, the user information may include red-green-blue (RGB) video data, depth data, skeletal tracking information, topography information, and movement information.

Figure 5:
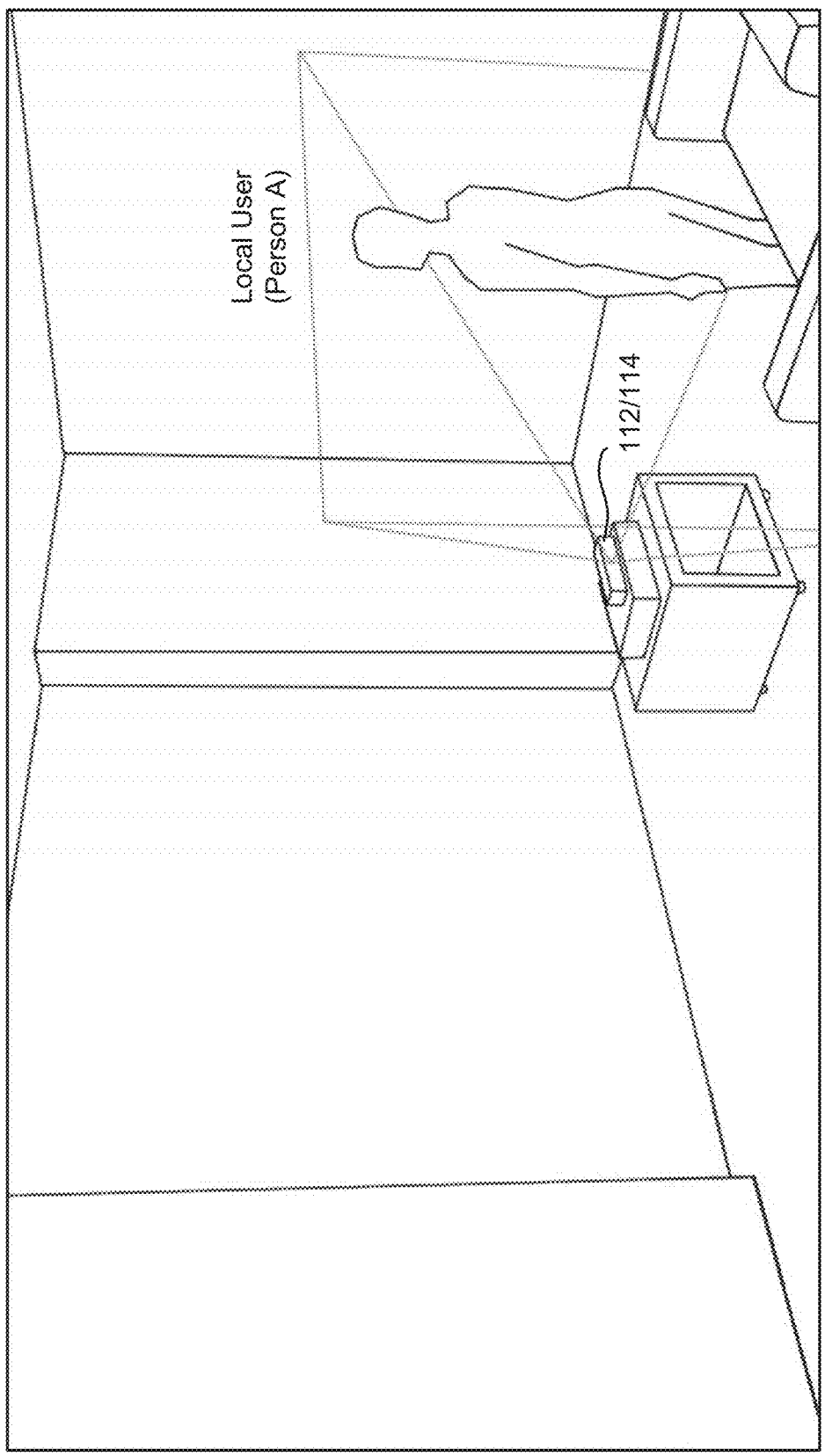
FIG. 5 illustrates an example scanning of the local user, according to some implementations.

FIG. 5 illustrates an example scanning of the local user (e.g., Person A), according to some implementations. In various implementations, depth sensor 112/114 of system 104 scans the local user to collect RGB video data, depth data, and skeletal tracking information of the user, and topography information. In some implementations, the topography information may include the floor plane on which the user is standing.

In some implementations, system 104 masks off the users depth data to outline a user identified in the scene and to render a 3D mesh inside the virtual scene. In some implementations, system 104 textures the virtual scene with the RGB video data provided by depth camera 112/114 in order to perform 3D mesh reconstruction.

In various implementations, depth camera 112/114 also detects user movement information of the user such as head movement, body movement, hand movement of the users, etc. Depth camera 112/114 also detects the users interaction with the projected virtual environment and/or the projected virtual objects in the virtual environment in order to enable 3D virtualization of the virtual environment by the 3D projector.

System 104 uses the environment geometry data and user information to create a 3D virtualization of a scene in the virtual environment and one or more users, and combines them into the shared virtual environment.

Referring still to FIG. 2, at block 206, system 104 positions the local user in the virtual environment based on the projection mapping and the user information. For example, in various implementations, 3D projector 110 positions the local user such that the local user is aligned to the floor plane in the scene of the virtual environment.

Figure 6:
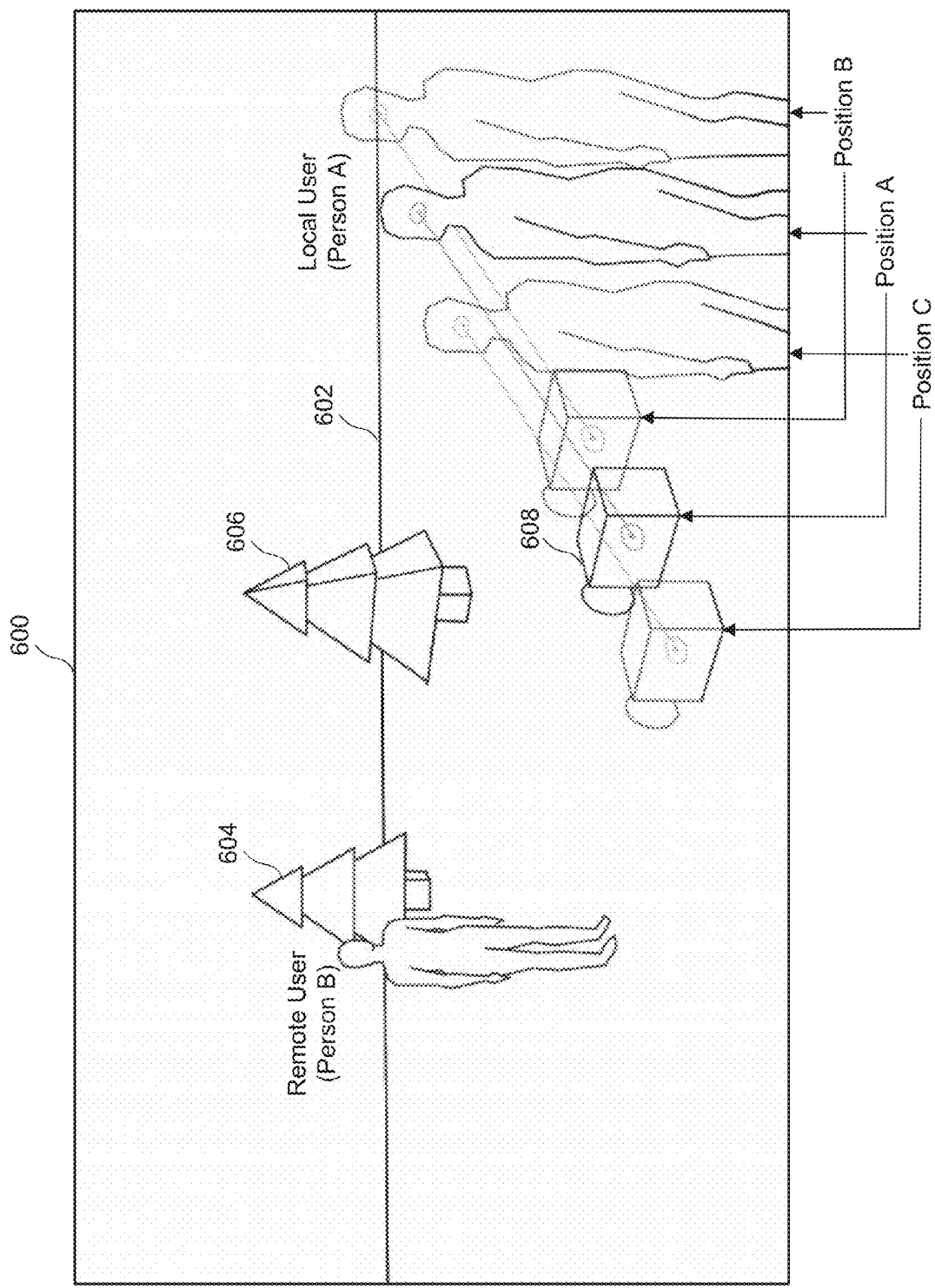
FIG. 6 illustrates an example positioning of the local user in the virtual environment, according to some implementations.

FIG. 6 illustrates an example positioning of the local user in the virtual environment 600, according to some implementations. As indicated herein, 3D projector 110 positions the local user (e.g., Person A) such that the local user is aligned to the floor plane 602 in the scene of virtual environment 600. Also, if there are multiple users (e.g., Person A, Person B, etc.), 3D projector 110 positions all of the users (local and remote users) such that all users are aligned to floor plane 602 in the scene of virtual environment 600. Also shown are trees 604 and 606. Other types of objects in virtual environment 600 are possible. For example, virtual environment 600 may include other remote users, buildings, roads, cars, etc. In some implementations, system 104 may use a game engine to render the mesh of the local user in virtual environment 600.

In various implementations, because system 104 obtains full skeletal tracking of the local user, system 104 may also determine the head position of the local user. Tracking the local user's head position enables co-location of virtual cameras in the virtual scene with the local user's POV.

In various implementations, system 104 associates a virtual camera 608 with the local user based on the projection mapping and the user information, where the POV of virtual camera 608 is based on the local user head position and direction. As such, in various implementations, the POV of virtual camera 608 is calibrated such that the POV of virtual camera 608 is substantially the same as the POV of the user and tracks the POV of the user based on the head position and direction of the local user. As such, the POV of virtual camera 608 may be treated as, and referred to as, the POV of the local user.

In various implementations, system 104 performs head tracking in order to move virtual camera 608 associated with the local user for parallax effect, which may also be referred to as head parallax. In various implementations, head parallax is an effect whereby the position or direction of an object appears to differ when viewed from different positions (e.g., an object that the user is looking at such as a tree, another user, etc.).

In various implementations, if the actual head of the local user moves from left to right, the POV of virtual camera 608 associated with the local user also moves from left to right in the virtual environment. For example, in a scenario where local user (e.g., Person A) is looking at remote user (e.g., Person B), if the local user is facing directly toward remote user (Position A), the location of virtual camera 608 and the corresponding POV is also at Position A. As a result, the local user will view all of the remote user straight on.

In a scenario where the local user (e.g., Person A) physically steps to the local user's right (Position B), the location of virtual camera 608 and the corresponding POV also shifts to the local user's right (Position B). As a result, the local user will perceive that remote user (e.g., Person B) shifts to local user's left.

In a scenario where the local user (e.g., Person A) physically steps to local user's left (Position C), the location of virtual camera 608 and the corresponding POV also shifts to the local user's left (Position C). As a result, the local user will perceive that remote user shifts to the local user's right.

In another scenarios, if the local user and remote user are facing each other and there is a tree (e.g., tree 606) between local user and remote user, the local user would see the remote user and one side of the tree, and remote user would see the local user and the other side of the tree.

Referring still to FIG. 2, at block 208, system 104 determines the POV of the local user in the virtual environment. In some implementations, the POV of the local user may be determined by a distance algorithm that approximates a virtual distance between the local user and one or more objects in virtual environment 600. In various implementations, the virtual distances may be based on one or more of the projection mapping, the user information, and one or more objects in the virtual environment 600. As indicated herein, in various implementations, the POV of virtual camera 608 associated with the user is substantially the same as the POV of the user and tracks the POV of the user.

Figure 7:
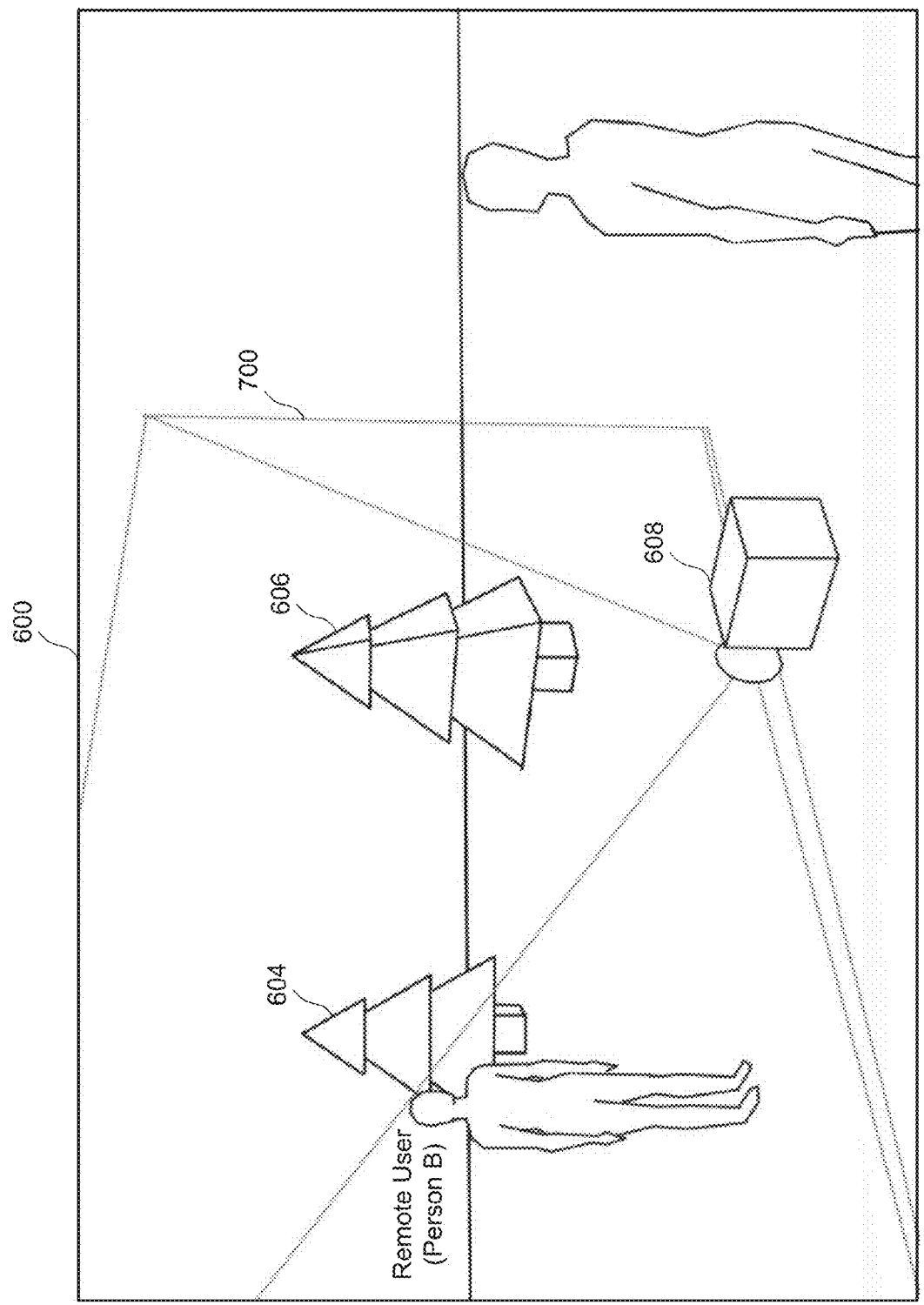
FIG. 7 illustrates an example projecting of the virtual environment onto the projection area based on the point of view (POV) of the local user, according to some implementations.

FIG. 7 illustrates an example projecting of virtual environment 600 onto the projection area based on the POV 700 of the local user, according to some implementations. As shown, in this particular scenario, POV 700 includes the remote user (e.g., Person B) and trees 604 and 606.

At block 210, system 104 projects virtual environment 600 onto the projection area 116 based on the POV of the local user. In various implementations, virtual environment 600 and associated objects are in life-size in scale. In various implementations, 3D projector 110 projects a 2-dimensional (2D) scene onto a 3D virtual environment around one or more users in order to render the one or more virtual objects including users in the virtual environment.

Figure 8:
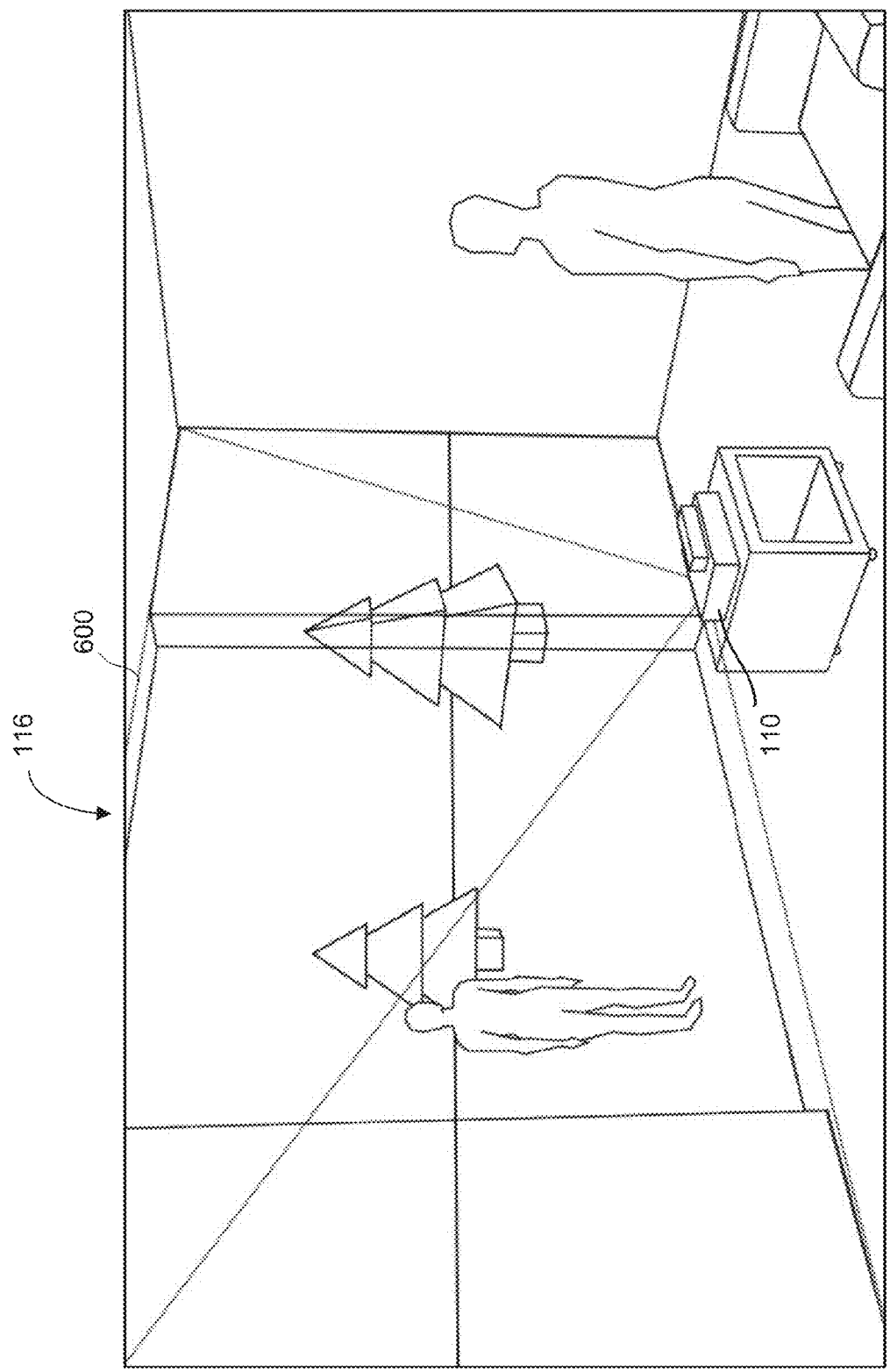
FIG. 8 illustrates an example projecting of the POV of the local user in life-size scale in the virtual environment, according to some implementations.

FIG. 8 illustrates an example projecting of virtual environment 600 onto the projection area 116 based on the POV of the local user, according to some implementations. In various implementations, the POV of the local user is based on a one-to-one ratio of the actual size of the user to the virtual size of the user in the virtual environment.

System 104 determines the actual height of the local user based on the depth data of the user. System 102 determines the size of the scene and objects in the virtual environment, adjusts/calibrates the objects including local and remote users in the virtual environment, and 3D projector 110 projects the virtual environment onto the projection area on a one-to-one scale (e.g., life size).

System 104 maps the positions of the users in physical space to the rendered users in the virtual environment. Because the 3D rendering is at a one-to-one scale, the local user has the visual sense that the remote user is co-located in the same virtual environment, and vice versa.

In some implementations, 3D projector 110 includes a wide-angle lens system for stereoscopic rendering of virtual environment 600. 3D projector 110 provides side-by-side stereoscopic rendering for a 3D display of virtual environment 600 without the need for a multiple projector setups. The wide-angle lens system of 3D projector 110 increases the throw projection without a need for a multi-projector setup.

In various implementations, system 104 simulates eye contact in the virtual environment when the local user (e.g., Person A) faces the remote user (e.g., Person B). More specifically, system 104 simulates the impression to the local user that the local user is making eye contact with the remote user in the virtual environment. This is because 3D projector 110 renders a 3D image of the virtual environment. As indicated herein, system 104 tracks the head movement of all of the users in order to achieve head parallax.

In various implementations, if both the local user and remote user are facing each other based on head parallax, system 104 positions the POV of the local user such that the POV of the virtual camera of the local user is facing the remote user. Conversely, system 104 positions the POV of the remote user such that the POV of the virtual camera of the remote user is facing the local user. In other words, system 104 renders the POV of the virtual cameras such that they are co-located to the head positions of the respective users. As a result, the general direction of the face of the rendered remote user faces the POV of the virtual camera of the local user based on the actual head position of the remote user. Similarly, the general direction of the face of the rendered local user faces the POV of the virtual camera of the remote user based on the actual head position of the local user. This gives both users the impression that they are making eye contact.

In an example scenario, if the local user (e.g., Person A) selects a given object such as a ball in the virtual environment, and the local user throws the object toward the remote user (e.g., Person B) in the virtual environment, the object will appear to the local user in environment 100 to travel away from the local user toward remote user. Conversely, the object will appear to the remote user in environment 102 to travel away from the local user toward remote user. If the remote user selects to catch the object, the object will appear to the remote user in environment 102 to have been caught. Conversely, the object will appear to the local user in environment 100 to have been caught by the remote user. In some implementations, if the remote user throws the objet back, the scene may rotate in order to show both users throwing the object back and forth, with head position affecting parallax.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 9:
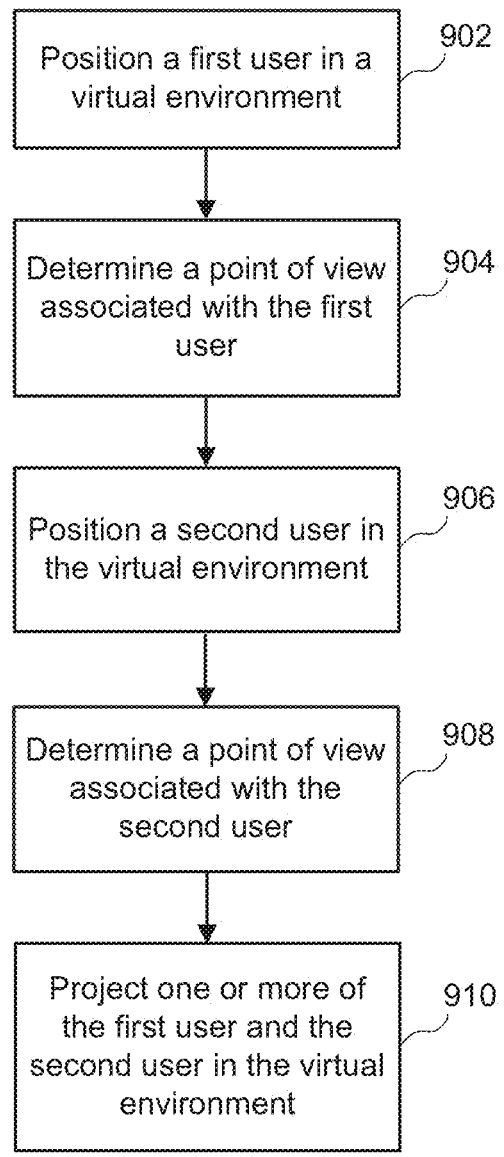
FIG. 9 illustrates an example flow diagram for implementing a telepresence system, according to some implementations.

FIG. 9 illustrates an example flow diagram for implementing a telepresence system, according to some implementations. Referring to both FIGS. 1 and 9, a method is initiated at block 902, where system 104 positions a first user in a virtual environment. In an example scenario, the first user may be the local user. The telepresence system used may be system 104 as shown in FIG. 1, for example. In various implementations, to position the first user in the virtual environment, system 104 collects user information associated with the first user, where the user information may include RGB video data, depth data, skeletal tracking information, topography information, and movement information. Further implementations directed to system 104 positioning the first user in the virtual environment are described in more detail below.

In some implementations, the positioning of the first user is based on user information. For example, in various implementations, the positioning of the first user may be based on RGB video data and/or depth data associated with the first user, poses of the first user, skeletal tracking information associated with the first user, etc.

At block 904, system 104 determines a POV associated with the first user. As indicated herein, in various implementations, system 104 determines the POV of the first user based on head tracking of the first user. As indicated herein, in various implementations, the POV of the first user may be determined by a distance algorithm that approximates a virtual distance between the local user and one or more objects in virtual environment. In various implementations, the virtual distances may be based on one or more of projection mapping, user information, and one or more objects in the virtual environment.

At block 906, system 104 positions a second user in the virtual environment. In an example scenario, the second user may be the remote user. In various implementations, to position the second user in the virtual environment, system 104 collects user information associated with the second user, where the user information may include RGB video data, depth data, skeletal tracking information, topography information, and movement information. Further implementations directed to system 104 positioning the second user in the virtual environment are described in more detail below.

In some implementations, the positioning of the second user is based on user information. For example, in various implementations, the positioning of the second user may be based on RGB video data and/or depth data associated with the second user, poses of the second user, skeletal tracking information associated with the second user, etc.

At block 908, system 104 determines a POV associated with the second user. As indicated herein, in various implementations, system 104 determines the POV of the second user based on head tracking of the second user. As indicated herein, in various implementations, the POV of the first user may be determined by a distance algorithm that approximates a virtual distance between the local user and one or more objects in virtual environment. In various implementations, the virtual distances may be based on one or more of projection mapping, user information, and one or more objects in the virtual environment.

At block 910, system 104 projects one or more of the first user and the second user in the virtual environment. In various implementations, system 104 projects the first user and/or the second user in the virtual environment the based on the positioning of the first user and the positioning of the second user and based on the point of view of the first user and the point of view of the second user.

As described in more detail herein, various implementations provide spontaneous social interaction, where multiple remote users may view each other and interact with each other in the virtual environment. Further implementations directed to system 104 projecting the first user and/or the second user in the virtual environment are described in more detail below.

Figure 10:
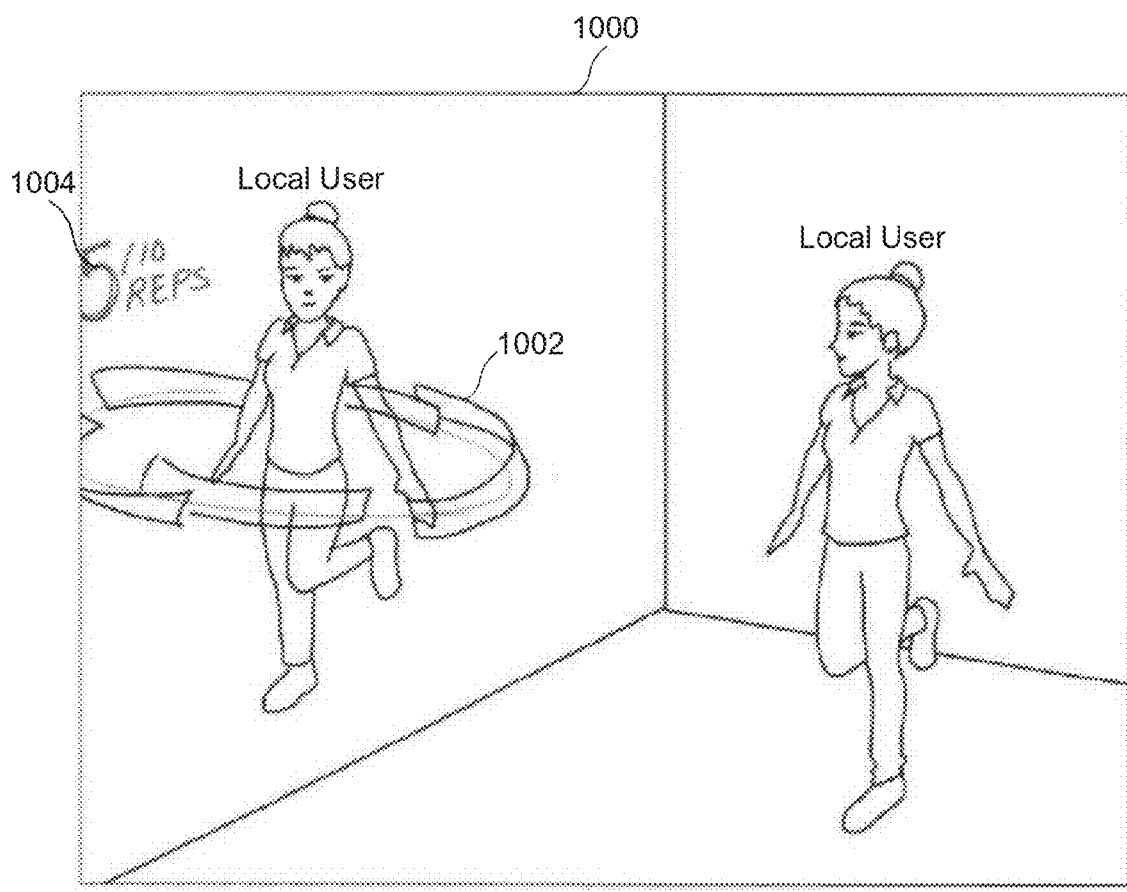
FIG. 10 illustrates an example image of a local user dancing in a virtual environment, according to some implementations.

FIG. 10 illustrates an example image of a local user dancing in a virtual environment 1000, according to some implementations. As shown, the local user is dancing in front of a projection area. Also, system 104 is projecting the local user in virtual environment 1000.

In various implementations, system 104 facilitates communication through the pose, movement, and rhythm of users' bodies, using a network of 3D projectors and depth devices to track the form and motion of users to instantiate them into a shared virtual space that can be transmitted to each location's display. For ease of illustration, the 3D projector and depth device(s) are not shown.

In various implementations, system 104 projects information in the virtual environment based on the movement of one or more of the first user and the second user. For example, as shown, system 104 is projecting information associated with the movement of the local user, where such information includes a movement indication 1002 and text information 1004. As shown, movement indication 1002 indicates that the local user is spinning. In some implementations, movement indication 1002 may also indicate direction of movement (not shown). For example, in some implementations, movement indication 1002 may indicate a rotational direction (e.g., clockwise, counter-clockwise, etc.), linear direction (e.g., up, down, left, right, forward, backward, etc., and/or any combination thereof. Also, as shown, text information 1004 indicates movement guidance. For example, text information 1004 shows "5/10 REPS," which means that 5 out of 10 repetitions have been completed. The information provided by movement indication 1002 and text information 1004 may vary and will depend on the particular implementation.

Figure 11:
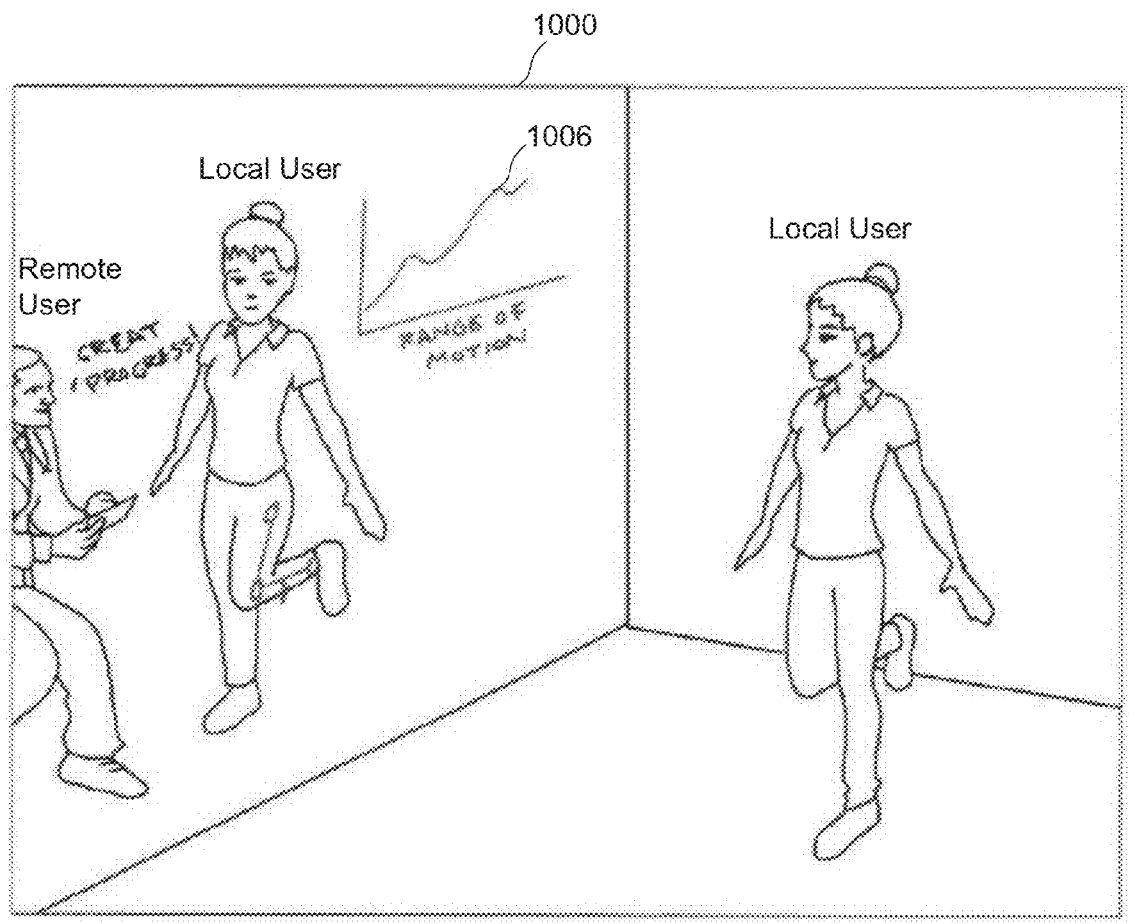
FIG. 11 illustrates an example image of a local user dancing in a virtual environment and a remote user coaching the local user in the virtual environment, according to some implementations.

FIG. 11 illustrates an example image of the local user dancing in the virtual environment 1000 and a remote user coaching the local user in virtual environment 1000, according to some implementations.

As shown, system 104 is projecting both the local user and the remote user in virtual environment 1000, as well as information associated with the movement of the user. For example, such information includes graph information 1006. In this particular example, graph information 1006 describes the local user's range of motion.

The local user and the remote user may communicate with each other about the movements of the local user in virtual environment 1000.

These implementations and others described herein may apply to other movement oriented activities. For example, implementations may apply to personal training, instruction, leisure and gaming, sports such as golf, tennis, etc., interactive arts, yoga, therapy such as physical therapy, etc. Implementations may also apply to training, instruction, remote medicine, therapy, industrial applications, etc.

Figure 12:
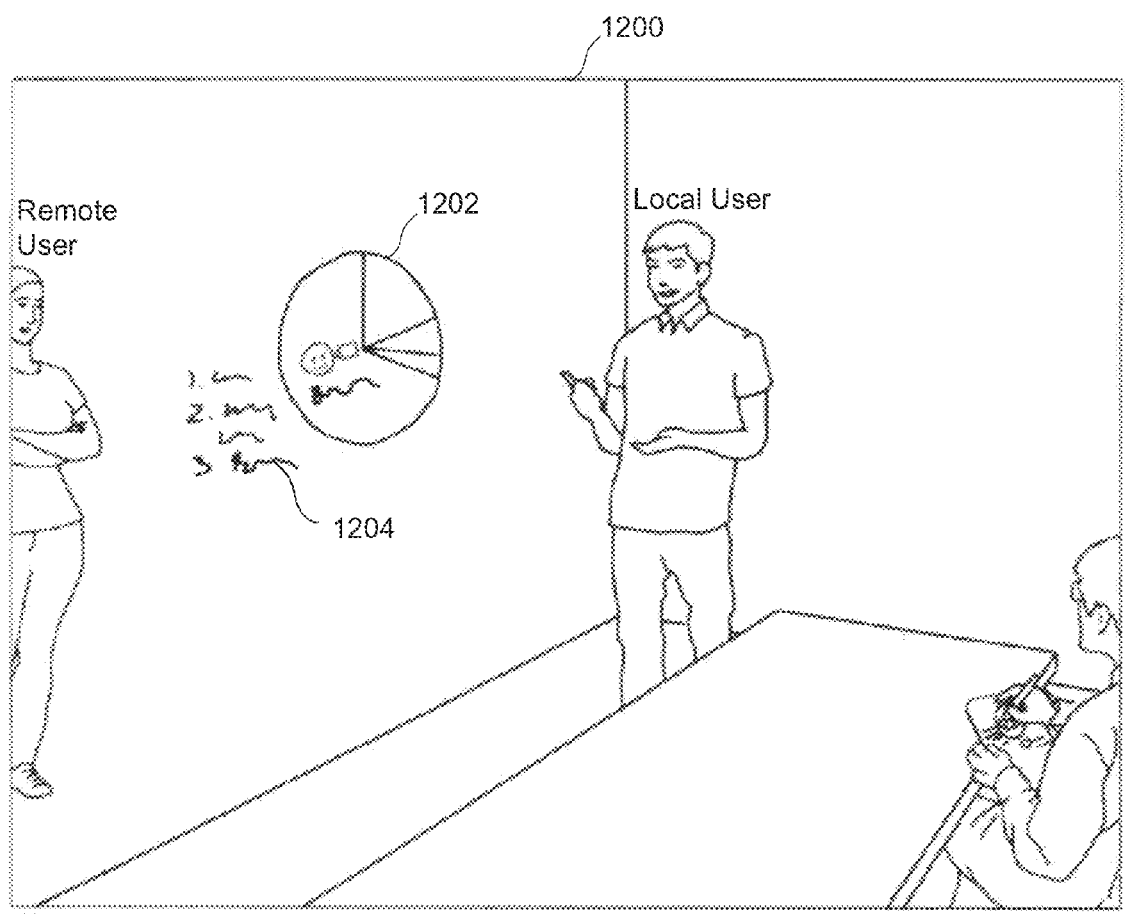
FIG. 12 illustrates an example image of a local user collaborating with a remote user in a virtual environment, according to some implementations.

FIG. 12 illustrates an example image of a local user collaborating with a remote user in a virtual environment 1200, according to some implementations. Implementations enable users to collaborate for personal and business purposes.

As shown, system 104 is projecting both the local user and the remote user in virtual environment 1200, as well as information associated with the collaboration. For example, such information includes graph information 1202 and text information 1204. In this particular example, graph information 1202 shows a pie chart graph. In various implementations, system 104 projects information in the virtual environment based on user input from one or more of the first user and the second user.

As indicated herein, in various implementations, system 104 simulates eye contact between the first user and the second user in the virtual environment. As described herein, system 104 simulates the impression to the local user that the local user is making eye contact with the remote user in the virtual environment. This is because 3D projector 110 renders a 3D image of the virtual environment, while system 104 tracks the head movement of all of the users in order to achieve head parallax. As such, in this particular example, when talking to each other, the local user may perceive the remote user to be making eye contact, and vice versa.

Figure 13:
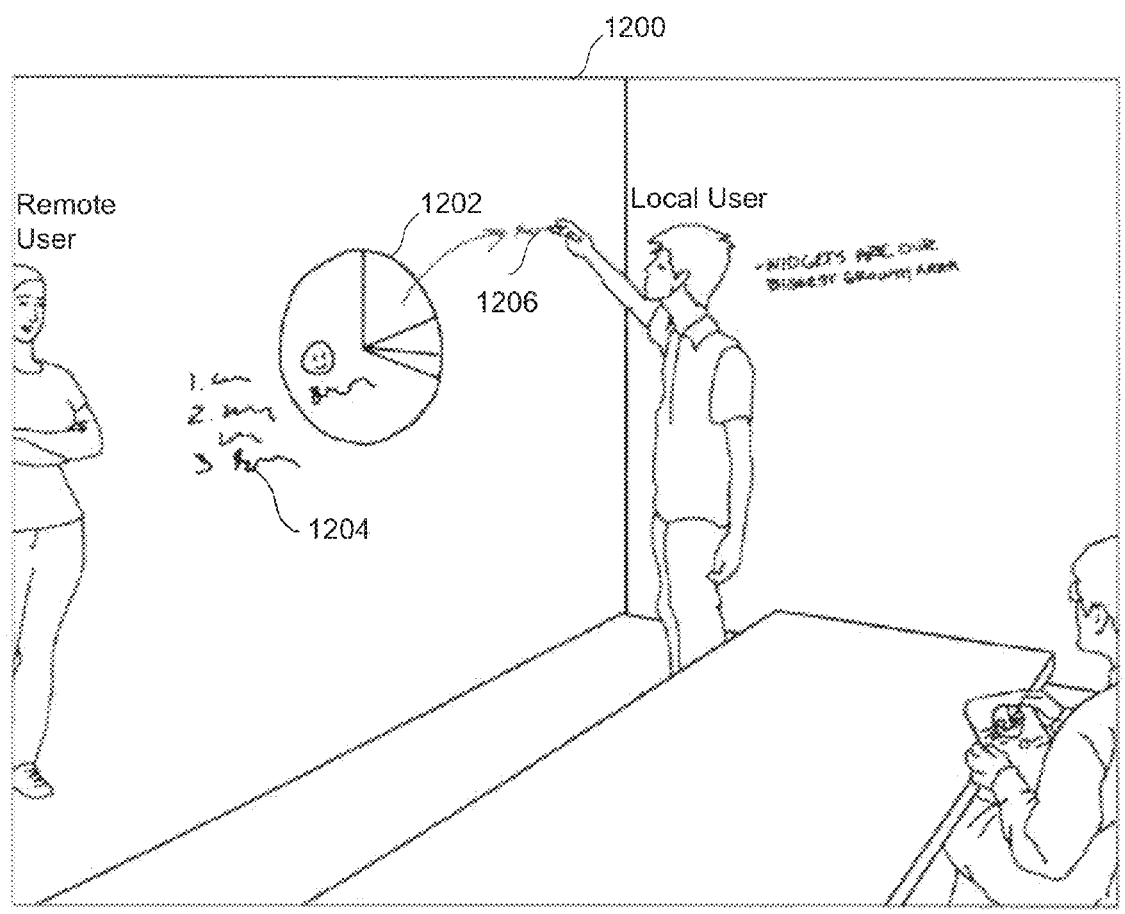
FIG. 13 illustrates another example image of the local user collaborating with the remote user in a virtual environment, according to some implementations.

FIG. 13 illustrates another example image of the local user collaborating with the remote user in virtual environment 1200, according to some implementations. As shown, the local user may add text information 1206 to existing graph information 1202 and text information 1204. In some implementation, the local user may write in virtual environment 1200 using gestures, which are detectable by system 104. In other words, system 104 may interpret the gestures to determine what the local user intents to communicate. For example, in some implementations, system 104 may map particular gestures to particular alphanumeric symbols and/or other shapes. Both the local user and the remote user may view and read text information 1206 along with graph information 1202 and text information 1204. In various implementations, system 104 orients any information accordingly in order for both the local user and the remote user to read it. In other words, text information written by the local user would not appear backwards to the remote user.

Figure 14:
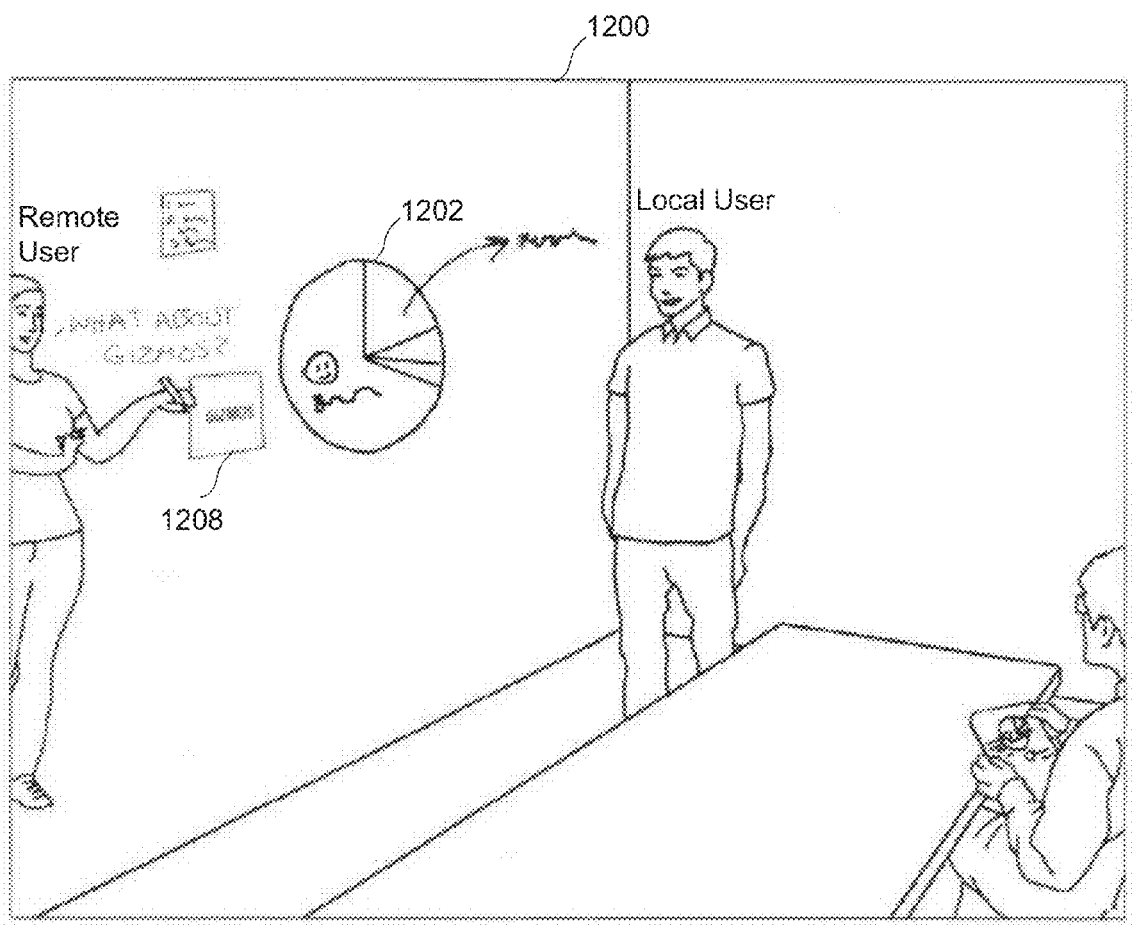
FIG. 14 illustrates another example image of the local user collaborating with the remote user in a virtual environment, according to some implementations.

FIG. 14 illustrates another example image of the local user collaborating with the remote user in virtual environment 1200, according to some implementations. As shown, the remote user is adding text information 1208 to existing graph information 1202, after having removed text information 1204. In various implementations, system 104 enables user to edit, add to, and/or remove other user's graph information and/or text information. In various implementations, system 104 enables a given user to indicate intent to add information or intent to remove information (e.g., by voice, by gesture, etc.).

Figure 15:
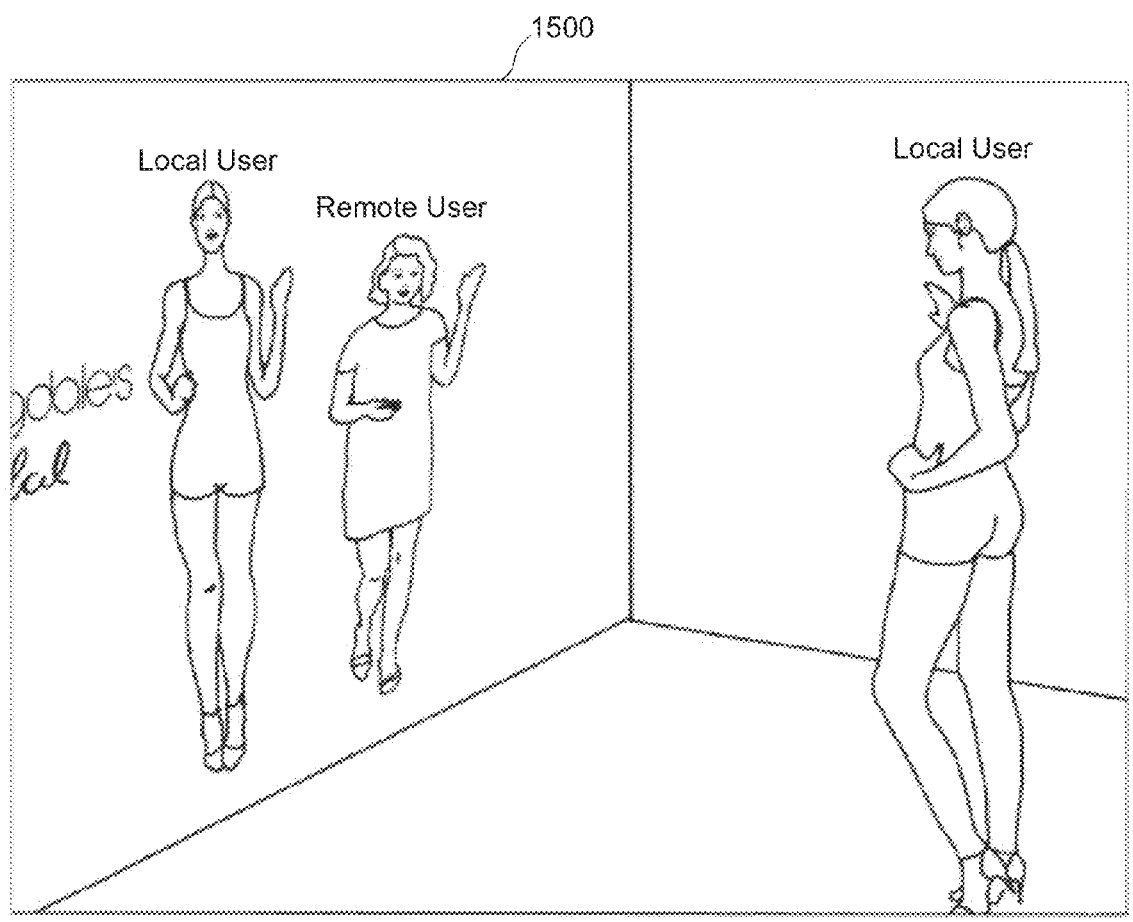
FIG. 15 illustrates an example image of a local user and a remote user in a virtual fitting room of a virtual environment, according to some implementations.

FIG. 15 illustrates an example image of a local user and a remote user in a virtual fitting room 1500 of a virtual environment, according to some implementations. As shown, system 104 is projecting both the local and the remote user in the virtual environment.

Figure 16:
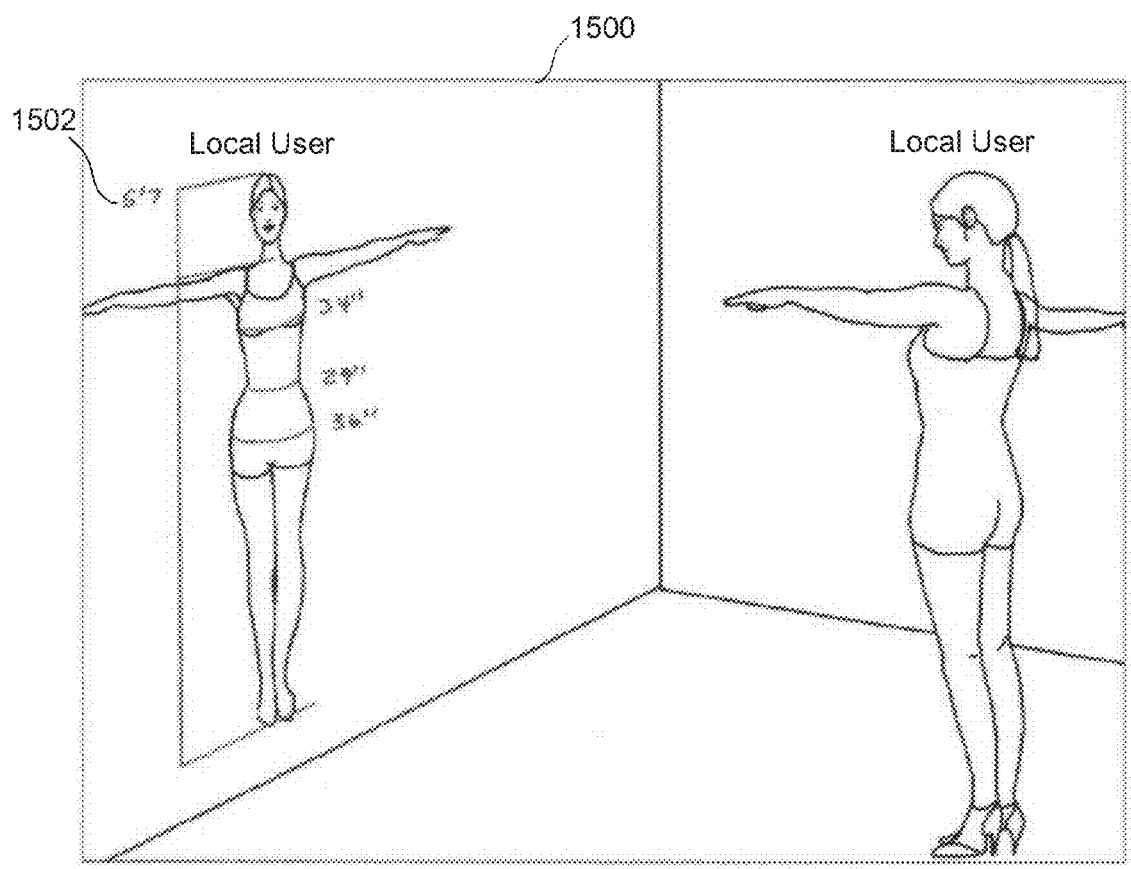
FIG. 16 illustrates an example image of the local user being measured in the virtual fitting room, according to some implementations.

FIG. 16 illustrates an example image of the local user being measured in virtual fitting room 1500, according to some implementations. As shown, system 104 is taking measurements of the local user, and showing resulting measurements 1502. In various implementations, system 104 may use depth data collected by one or more depth cameras, as well as other data such as skeletal tracking information, topography information, etc.

Figure 17:
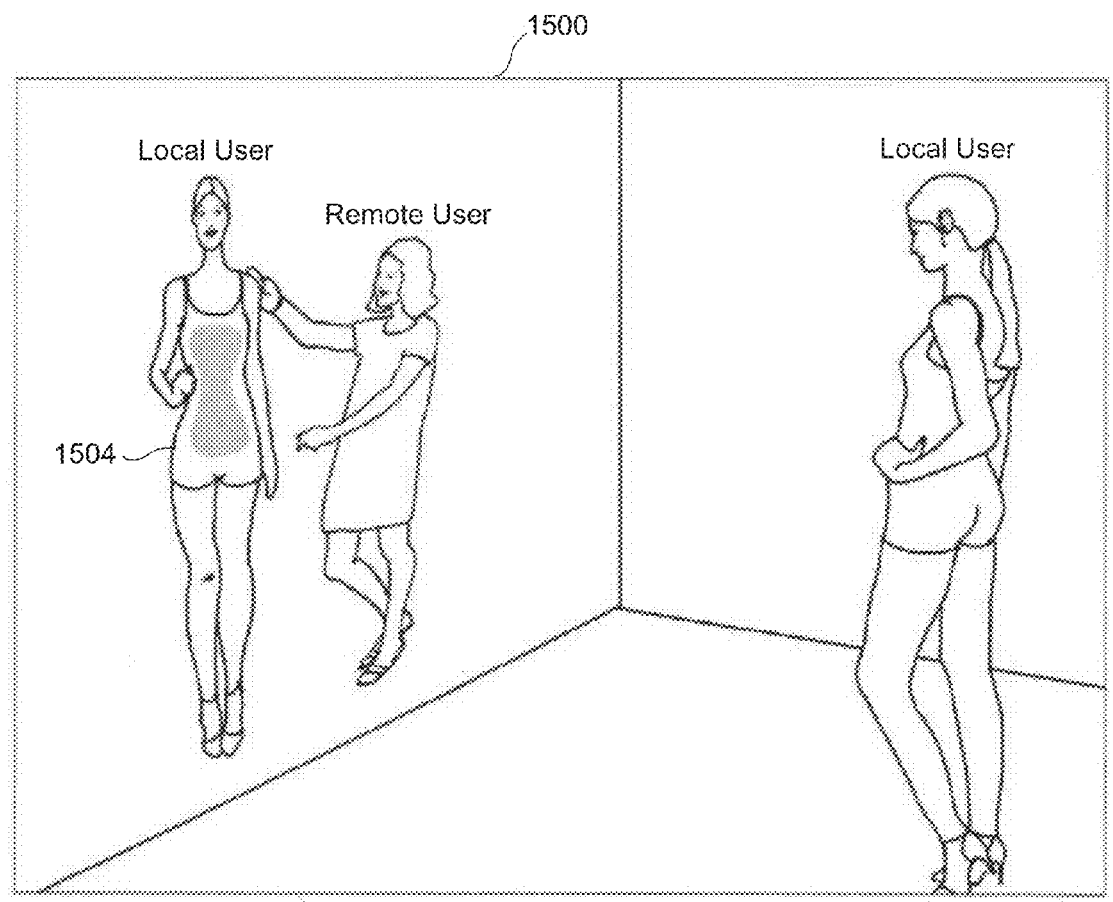
FIG. 17 illustrates another example image of the local user and the remote user in the virtual fitting room, according to some implementations.

FIG. 17 illustrates another example image of the local user and the remote user in virtual fitting room 1500, according to some implementations. As shown, the remote user is talking to the local user about the local user's body 1504. For example, they may discuss the local user's body type, dress size, etc.

Figure 18:
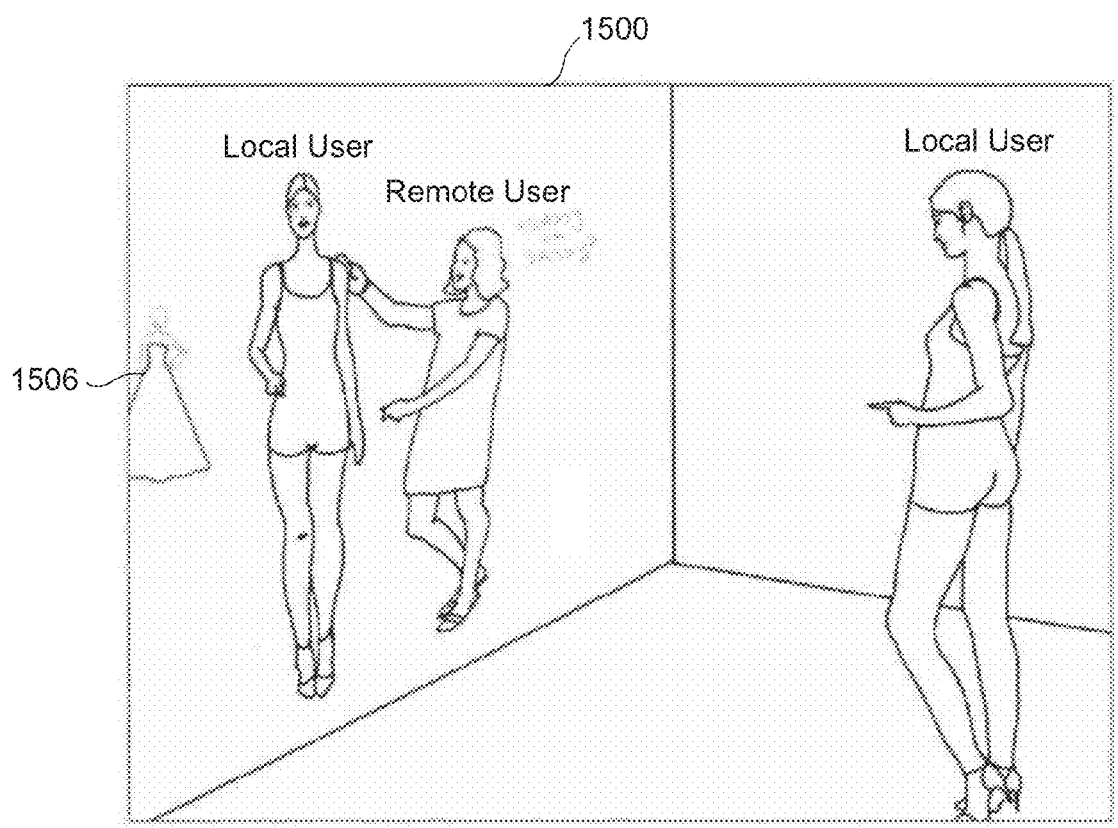
FIG. 18 illustrates another example image of the local user and the remote user in the virtual fitting room, according to some implementations.

FIG. 18 illustrates another example image of the local user and the remote user in virtual fitting room 1500, according to some implementations. In various implementations, system 104 may display possible items for purchase. For example, as shown, system 104 may display a new dress 1506.

Figure 19:
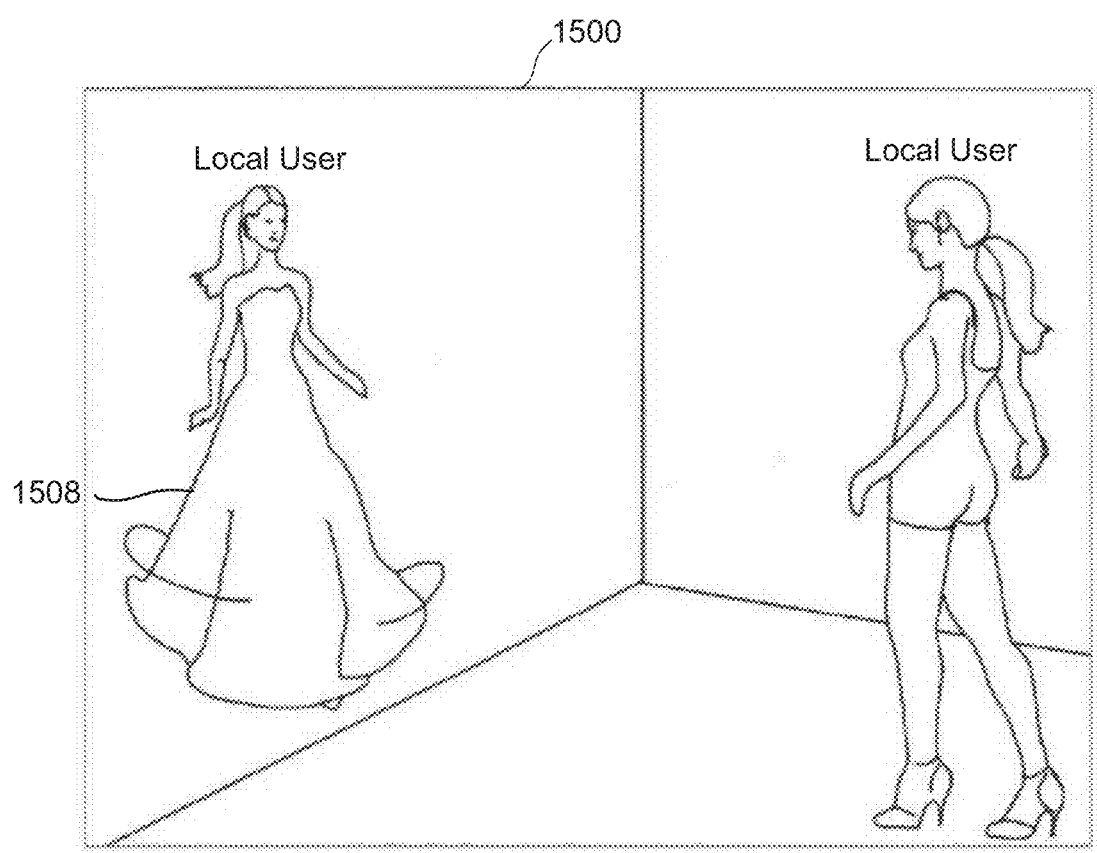
FIG. 19 illustrates an example image of the local user in a new dress in the virtual fitting room, according to some implementations.

FIG. 19 illustrates an example image of the local user in a new dress in virtual fitting room 1500, according to some implementations. In various implementations, if the local user wants to try on a particular dress, system 104 may display the dress on the local user. For example, as shown, system 102 may display the local user wearing a new dress 1508.

Figure 20:
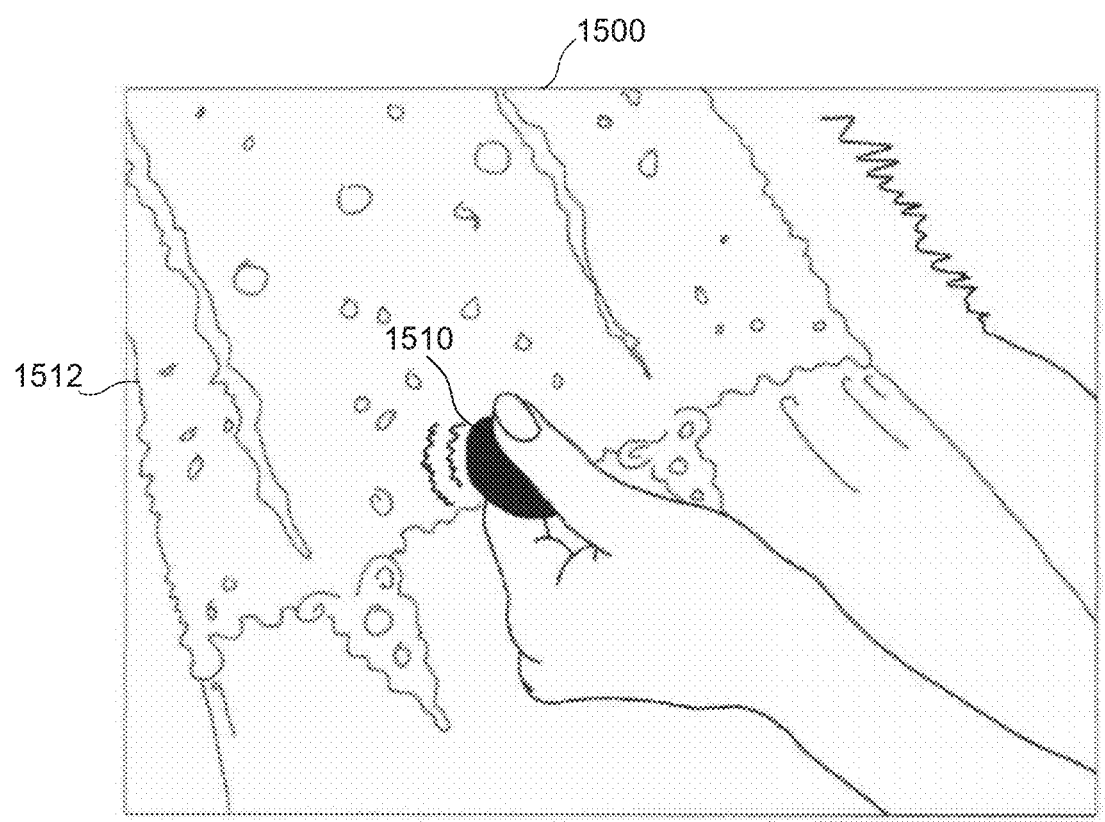
FIG. 20 illustrates an example image of the local user handling a new dress in the virtual fitting room, according to some implementations.

FIG. 20 illustrates an example image of the local user handling a new dress in virtual fitting room 1500, according to some implementations. In various implementations, system 104 may enable the user to virtually handle an item for closer inspection. For example, as shown, the local user is using a hand gesture 1510 to virtually handle a new dress 1512. In various implementations, system 104 may interpret the local user's gestures to determine what the local user intents to do (e.g., pull an object such as a dress toward the local user, etc.).

Figure 21:
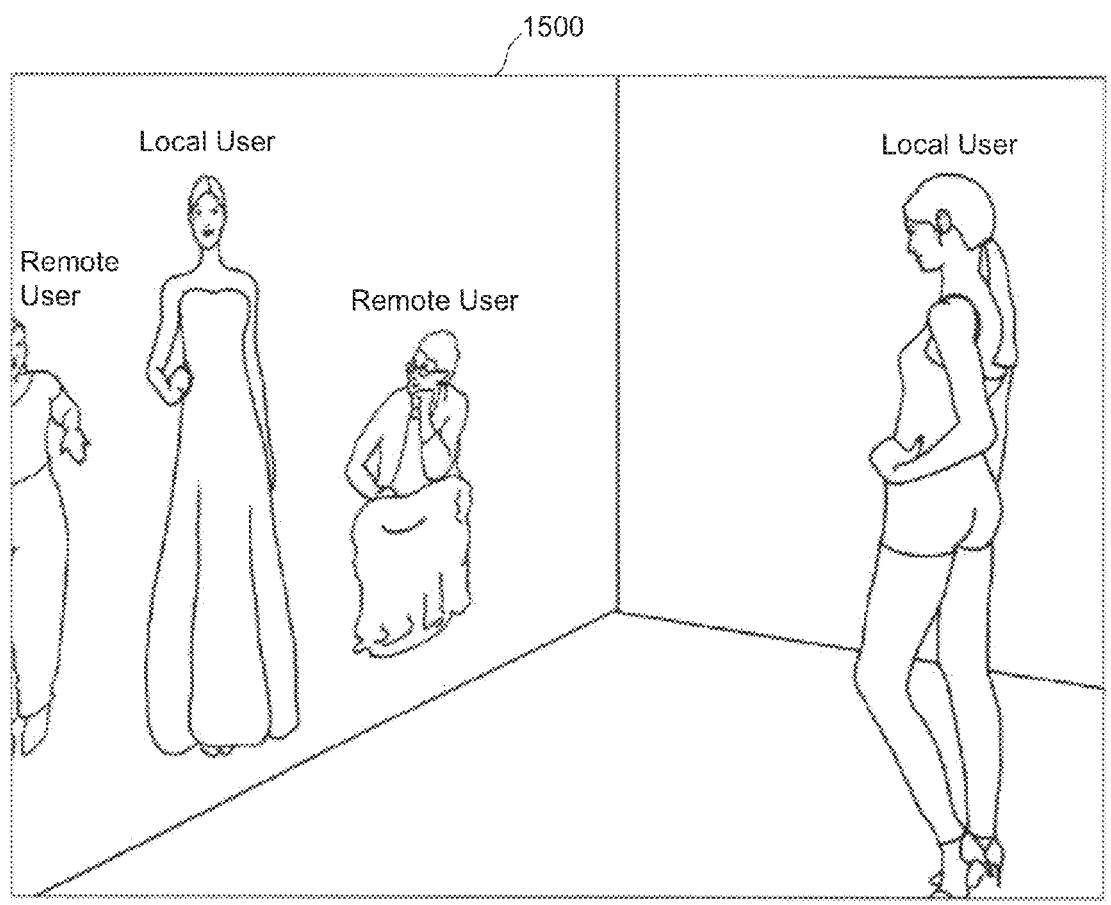
FIG. 21 illustrates an example image of the local user and two remote users in the virtual fitting room, according to some implementations.

FIG. 21 illustrates an example image of the local user and two remote users in virtual fitting room 1500, according to some implementations. In this example scenario, system 104 enables multiple users to interact with each other in the virtual environment.

Figure 22:
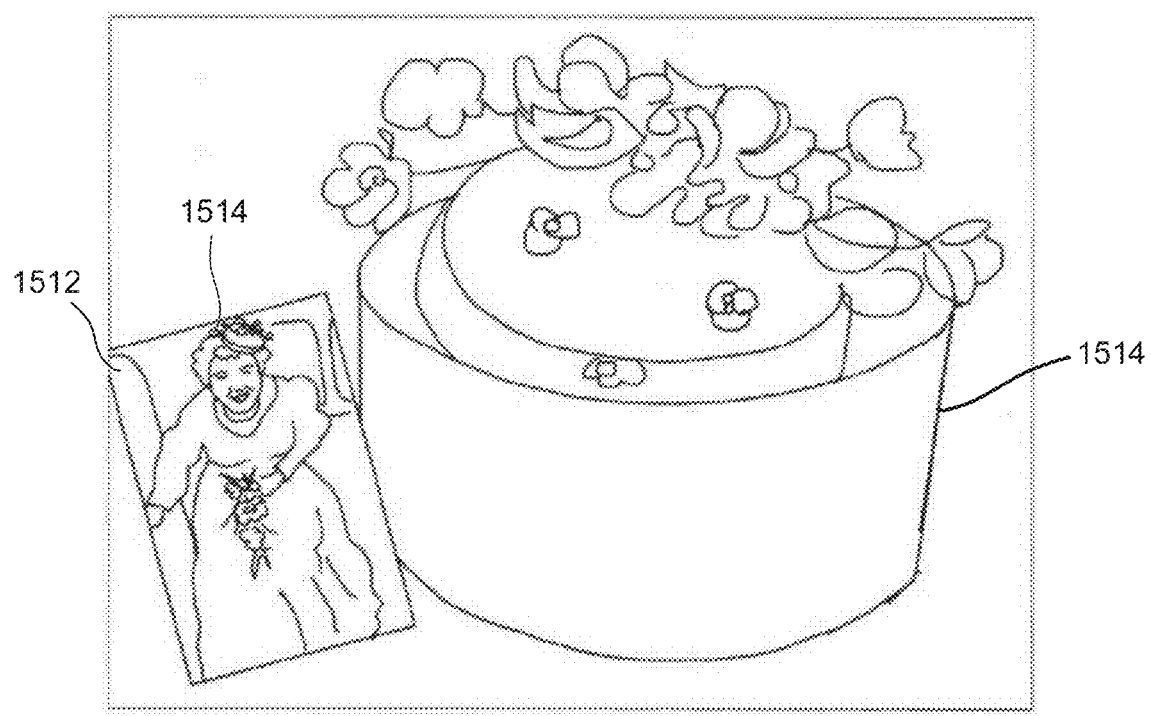
FIG. 22 illustrates an example image of a local user wearing a new hat and an example image of the hat in the virtual fitting room, according to some implementations.

FIG. 22 illustrates an example image of a user wearing a new hat and an example image of the hat, according to some implementations. As shown, system 104 is displaying a photo 1512 of a user wearing a hat 1514. System 104 is also displaying a larger or zoomed-in image of hat 1514. This enables the local user to view an object such as an article of clothing in different contexts.

Implementations described herein provide various benefits. For example, implementations described herein may be used in various virtual reality and augmented reality applications such as teleconferencing, collaboration, training, instruction, leisure and gaming, sports, interactive dance, yoga, remote medicine, therapy such as physical therapy, industrial applications, etc.

Figure 23:
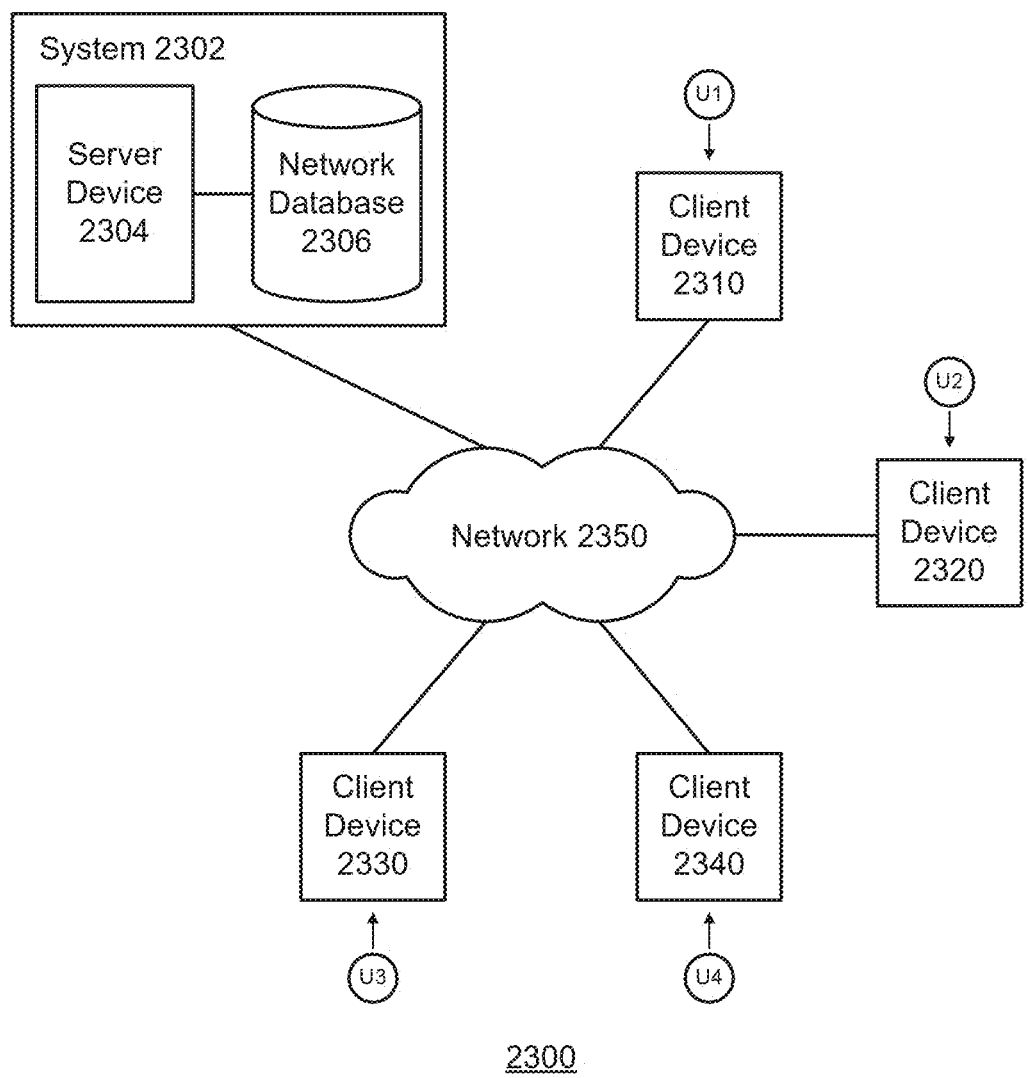
FIG. 23 illustrates a block diagram of an example network environment, which may be used for some implementations described herein.

FIG. 23 illustrates a block diagram of an example network environment 2300, which may be used for some implementations described herein. In some implementations, network environment 2300 includes a system 2302, which includes a server device 2304 and a network database 2306. Network environment 2300 also includes client devices 2310, 2320, 2330, and 2340, which may communicate with each other directly or via system 2302. Network environment 2300 also includes a network 2350.

For ease of illustration, FIG. 23 shows one block for each of system 2302, server device 2304, and network database 2306, and shows four blocks for client devices 2310, 2320, 2330, and 2340. Blocks 2302, 2304, and 2306 may represent multiple systems, server devices, and network databases. Also, there may be any number of client devices. In other implementations, network environment 2300 may not have all of the components shown and/or may have other elements including other types of elements instead of, or in addition to, those shown herein. In various implementations, users U1, U2, U3, and U4 may interact with each other or with system 2302 using respective client devices 2310, 2320, 2330, and 2340. In various implementations, each of client devices 2310, 2320, 2330, and 2340 may represent one of telepresence systems 104 and 124 of FIG. 1.

In the various implementations described herein, a processor of system 2302 and/or a processor of any client device 2310, 2320, 2330, and 2340 causes the elements described herein (e.g., information, etc.) to be displayed in a user interface on one or more display screens.

Implementations may apply to any network system and/or may apply locally for an individual user. For example, implementations described herein may be implemented by system 2302 and/or any client device 2310, 2320, 2330, and 2340. System 2302 may perform the implementations described herein on a stand-alone computer, tablet computer, smartphone, etc. System 2302 and/or any of client devices 2310, 2320, 2330, and 2340 may perform implementations described herein individually or in combination with other devices.

Figure 24:
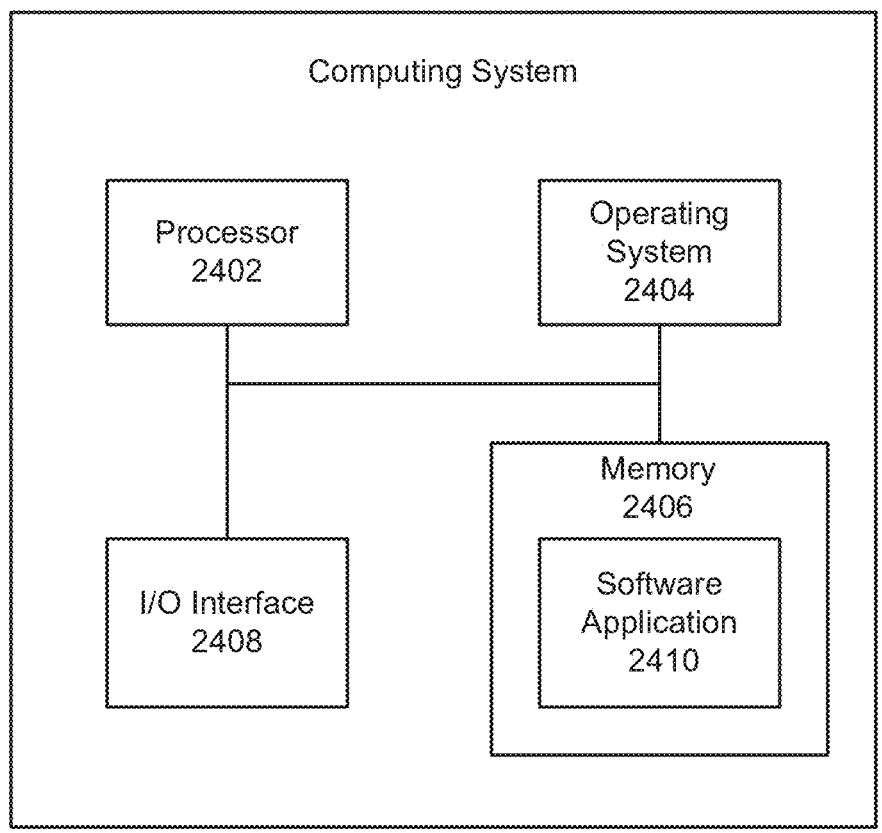
FIG. 24 illustrates a block diagram of an example computing system, which may be used for some implementations described herein.

FIG. 24 illustrates a block diagram of an example computing system 2400, which may be used for some implementations described herein. For example, computing system 2400 may be used to implement computing systems 106, 108, 126, and/or 128 of FIG. 1 and/or server device 2304 of FIG. 23, as well as to perform the implementations described herein. In some implementations, computing system 2400 may include a processor 2402, an operating system 2404, a memory 2406, and an input/output (I/O) interface 2408. In various implementations, processor 2402 may be used to implement various functions and features described herein, as well as to perform the method implementations described herein. While processor 2402 is described as performing implementations described herein, any suitable component or combination of components of computing system 2400 or any suitable processor or processors associated with computing system 2400 or any suitable system may perform the steps described. Implementations described herein may be carried out on a user device, on a server, or a combination of both.

Computing system 2400 also includes a software application 2410, which may be stored on memory 2406 or on any other suitable storage location or computer-readable medium. Software application 2410 provides instructions that enable processor 2402 to perform the implementations described herein and other functions. Software application may also include an engine such as a network engine for performing various functions associated with one or more networks and network communications. The components of computing system 2400 may be implemented by one or more processors or any combination of hardware devices, as well as any combination of hardware, software, firmware, etc.

For ease of illustration, FIG. 24 shows one block for each of processor 2402, operating system 2404, memory 2406, I/O interface 2408, and software application 2410. These blocks 2402, 2404, 2406, 2408, and 2410 may represent multiple processors, operating systems, memories, I/O interfaces, and software applications. In various implementations, computing system 2400 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method comprising:
    positioning a first user in a virtual environment, wherein the first user is a local user;
    determining a first point of view associated with the first user;
    positioning a second user in the virtual environment, wherein the second user is a remote user;
    determining a second point of view associated with the second user; and
    projecting the first user and the second user in the virtual environment on at least one same display screen based on a first positioning of the first user and a second positioning of the second user and based on the first point of view and the second point of view; and
    detecting movement information of the first user using a local depth sensor, wherein the movement information includes skeletal tracking information of the first user;
    projecting the information of the first user in the virtual environment, wherein the information includes a movement indication and text information.

2. The method of claim 1, wherein the first positioning of the first user and the second positioning of the second user are based on one or more of respective red-green-blue video data and depth data.

3. The method of claim 1, wherein the first positioning of the first user and the second positioning of the second user are based on respective poses of the first user and the second user.

4. The method of claim 1, wherein the first positioning of the first user and the second positioning of the second user are based on respective skeletal tracking information associated with the first user and the second user.

5. The method of claim 1, wherein the method further comprises:
    determining the first point of view based on head tracking of the first user; and
    determining the second point of view based on head tracking of the second user.

6. The method of claim 1, wherein the method further comprises projecting information in the virtual environment based on movement of one or more of the first user and the second user.

7. The method of claim 1, wherein the method further comprises simulating eye contact between the first user and the second user in the virtual environment.

8. A non-transitory computer-readable storage medium carrying program instructions thereon, the instructions when executed by one or more processors are operable to perform operations comprising:
    positioning a first user in a virtual environment, wherein the first user is a local user;
    determining a first point of view associated with the first user;
    positioning a second user in the virtual environment, wherein the second user is a remote user;
    determining a second point of view associated with the second user; and
    projecting the first user and the second user in the virtual environment on at least one same display screen based on a first positioning of the first user and a second positioning of the second user and based on the first point of view and the second point of view; and
    detecting movement information of the first user using a local depth sensor, wherein the movement information includes skeletal tracking information of the first user;
    projecting the information of the first user in the virtual environment, wherein the information includes a movement indication and text information.

9. The computer-readable storage medium of claim 8, wherein the first positioning of the first user and the second positioning of the second user are based on one or more of respective red-green-blue video data and depth data.

10. The computer-readable storage medium of claim 8, wherein the first positioning of the first user and the second positioning of the second user are based on respective poses of the first user and the second user.

11. The computer-readable storage medium of claim 8, wherein the first positioning of the first user and the second positioning of the second user are based on respective skeletal tracking information associated with the first user and the second user.

12. The computer-readable storage medium of claim 8, wherein the instructions when executed are further operable to perform operations comprising:
   determining the first point of view based on head tracking of the first user; and
   determining the second point of view based on head tracking of the second user.

13. The computer-readable storage medium of claim 8, wherein the instructions when executed are further operable to perform operations comprising projecting information in the virtual environment based on movement of one or more of the first user and the second user.

14. The computer-readable storage medium of claim 8, wherein the instructions when executed are further operable to perform operations comprising simulating eye contact between the first user and the second user in the virtual environment.

15. A system comprising:
   one or more processors; and
   logic encoded in one or more non-transitory computer-readable storage media for execution by the one or more processors and when executed operable to perform operations comprising:
   positioning a first user in a virtual environment, wherein the first user is a local user;
   determining a first point of view associated with the first user;
   positioning a second user in the virtual environment, wherein the second user is a remote user;
   determining a second point of view associated with the second user; and
   projecting the first user and the second user in the virtual environment on at least one same display screen based on a first positioning of the first user and a second positioning of the second user and based on the first point of view and the second point of view; and
   detecting movement information of the first user using a local depth sensor, wherein the movement information includes skeletal tracking information of the first user;
   projecting the information of the first user in the virtual environment, wherein the information includes a movement indication and text information.

16. The system of claim 15, wherein the first positioning of the first user and the second positioning of the second user are based on one or more of respective red-green-blue video data and depth data.

17. The system of claim 15, wherein the first positioning of the first user and the second positioning of the second user are based on respective poses of the first user and the second user.

18. The system of claim 15, wherein the first positioning of the first user and the second positioning of the second user are based on respective skeletal tracking information associated with the first user and the second user.

19. The system of claim 15, wherein the logic when executed is further operable to perform operations comprising:
   determining the first point of view based on head tracking of the first user; and
   determining the second point of view based on head tracking of the second user.

20. The system of claim 15, wherein the logic when executed is further operable to perform operations comprising projecting information in the virtual environment based on movement of one or more of the first user and the second user.

* * * * *